(12) United States Patent
Kojima et al.

(10) Patent No.: US 10,118,509 B2
(45) Date of Patent: Nov. 6, 2018

(54) SEAT RECLINING DEVICE FOR VEHICLE

(71) Applicant: AISIN SEIKI KABUSHIKI KAISHA, Kariya-shi (JP)

(72) Inventors: Yasuhiro Kojima, Kariya (JP); Mikihito Nagura, Bangalore (IN); Shinya Isobe, Nagoya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 92 days.

(21) Appl. No.: 15/325,467

(22) PCT Filed: Jul. 6, 2015

(86) PCT No.: PCT/JP2015/069434
§ 371 (c)(1),
(2) Date: Jan. 11, 2017

(87) PCT Pub. No.: WO2016/009875
PCT Pub. Date: Jan. 21, 2016

(65) Prior Publication Data
US 2017/0158091 A1 Jun. 8, 2017

(30) Foreign Application Priority Data

Jul. 14, 2014 (JP) .................................. 2014-144557
Jul. 14, 2014 (JP) .................................. 2014-144559

(51) Int. Cl.
*B60N 2/02* (2006.01)
*B60N 2/30* (2006.01)
(Continued)

(52) U.S. Cl.
CPC ............. *B60N 2/2354* (2013.01); *B60N 2/20* (2013.01); *B60N 2/2227* (2013.01)

(58) Field of Classification Search
CPC ...... B60N 2/20; B60N 2/2354; B60N 2/2227; B60N 2/2358; B60N 2/2878
(Continued)

(56) References Cited

U.S. PATENT DOCUMENTS 5,823,622 A * 10/1998 Fisher, IV .............. B60N 2/232
297/362.12
6,341,819 B1 * 1/2002 Kojima .................. B60N 2/071
248/429

(Continued)

FOREIGN PATENT DOCUMENTS

JP      2010-22471 A      2/2010

OTHER PUBLICATIONS

International Preliminary Report on Patentability and Written Opinion dated Jan. 17, 2017 in PCT/JP2015/069434.
(Continued)

*Primary Examiner* — Mark R Wendell
(74) *Attorney, Agent, or Firm* — Oblon, McClelland, Maier & Neustadt, L.L.P.

(57) ABSTRACT

When a first memory member rotates relative to a second rotating member to a predetermined relative rotation position at which a second memory member sliding on a sliding surface is capable of entering an engagement slot, the slide-trailing end of the second memory member, which leaves the sliding surface last, is a corner having no round shape. Further, the boundary between the sliding surface and the engagement slot is also a corner having no round shape.

10 Claims, 13 Drawing Sheets

(51) Int. Cl.
*B60N 2/235* (2006.01)
*B60N 2/22* (2006.01)
*B60N 2/20* (2006.01)

(58) Field of Classification Search
USPC ..... 297/363, 378.12, 374, 376, 367 P, 367 R
See application file for complete search history.

(56) References Cited

U.S. PATENT DOCUMENTS

| | | | | |
|---|---|---|---|---|
| 7,255,398 | B2* | 8/2007 | Tokui | B60N 2/20 |
| | | | | 297/354.12 |
| 8,033,607 | B2 | 10/2011 | Kojima et al. | |
| 8,985,690 | B2* | 3/2015 | Yamada | B60N 2/2358 |
| | | | | 297/341 |
| 9,278,630 | B2* | 3/2016 | Couasnon | B60N 2/2358 |
| 9,849,811 | B2* | 12/2017 | Kojima | B60N 2/2358 |
| 2006/0012232 | A1* | 1/2006 | Coughlin | B60N 2/20 |
| | | | | 297/367 R |
| 2007/0090674 | A1* | 4/2007 | Miyauchi | B60N 2/20 |
| | | | | 297/378.12 |
| 2007/0096530 | A1* | 5/2007 | Ohba | B60N 2/20 |
| | | | | 297/367 R |
| 2007/0102981 | A1* | 5/2007 | Pejathaya | B60N 2/20 |
| | | | | 297/367 R |
| 2009/0243362 | A1* | 10/2009 | Wieclawski | B60N 2/2358 |
| | | | | 297/366 |
| 2010/0123343 | A1* | 5/2010 | Bonk | B60N 2/2358 |
| | | | | 297/378.12 |
| 2011/0109142 | A1* | 5/2011 | Kojima | B60N 2/2358 |
| | | | | 297/354.12 |
| 2011/0115272 | A1* | 5/2011 | Kojima | B60N 2/2352 |
| | | | | 297/367 R |
| 2013/0113260 | A1 | 5/2013 | Kojima | |
| 2013/0161995 | A1* | 6/2013 | Yamada | B60N 2/12 |
| | | | | 297/367 P |
| 2016/0023577 | A1* | 1/2016 | Yamada | B60N 2/2227 |
| | | | | 297/367 R |
| 2017/0151893 | A1* | 6/2017 | Kojima | B60N 2/2358 |
| 2017/0158091 | A1* | 6/2017 | Kojima | B60N 2/2354 |
| 2017/0158092 | A1* | 6/2017 | Kojima | B60N 2/2354 |
| 2017/0158093 | A1* | 6/2017 | Kojima | B60N 2/2358 |
| 2017/0327010 | A1* | 11/2017 | Noguchi | B60N 2/2358 |

OTHER PUBLICATIONS

U.S. Appl. No. 15/325,641, filed Jan. 11, 2017, Yasuhiro Kojima, et al.
U.S. Appl. No. 15/325,616, filed Jan. 11, 2017, Yasuhiro Kojima, et al.
U.S. Appl. No. 15/325,664, filed Jan. 11, 2017, Yasuhiro Kojima, et al.
International Search Report dated Aug. 11, 2015 in PCT/JP2015/069434 filed Jul. 6, 2015.

* cited by examiner

SEAT RECLINING DEVICE FOR VEHICLE

TECHNICAL FIELD

The present invention relates to a seat reclining device for a vehicle.

BACKGROUND ART

Some conventional vehicle seat reclining devices include a first rotating member, a second rotating member arranged coaxially with the first rotating member, a locking member that limits relative rotation between the first and second rotating members. The seat reclining device disclosed in Patent Document 1 further includes a first memory member and a second memory member. The first memory member engages with the outer surface of the first rotating member through friction. The second memory member engages with the first memory member at a predetermined relative rotation position to restrict the first memory member from rotating relative to the second rotating member. In the above described configuration, when the seat back is folded forward to execute a walk-in access enabling action for facilitating entry into and exit from the rear seat, the locking member is either locked or unlocked in conjunction with engaging/disengaging action of the second memory member with the first memory member. This allows the seat back, which has been folded forward, to be returned to the inclined position at which the seat back was located before the forward folding operation.

Many of the above seat reclining devices have an operation handle on the side of the seat. The operation handle is manipulated to cause the locking member to cancel the constraint between the first and second rotating members, so that the tilt angle of the seat back can be adjusted. At a normal reclining operation, the seat reclining device disclosed in Patent Document 1 causes the second memory member to engage with the first memory member to restrict the first memory member from rotating relative to the second rotating member. The first rotating member is allowed to rotate relative to the second rotating member by acting against the frictional engagement force between the first rotating member and the first memory member.

In contrast, at the time of walk-in access enabling action, the locking member is unlocked in conjunction with separation of the second memory member from the first memory member. That is, when the second memory member is separated from the first memory member, the first memory member and the first rotating member rotate integrally due to the frictional engagement force. Then, when the forward folded seat back is raised, the second memory member is engaged with the first memory member at a predetermined relative rotation position, so that the seat back is returned to the inclined position at which the seat back was located before the forward folding operation.

In this conventional example, a memory ring 91 is employed as the first memory member. As shown in FIG. 20, the memory ring 91 has an engagement slot 90 at a predetermined position in the circumferential direction. Further, a substantially columnar memory pin 92 is employed as the second memory member. The memory pin 92 enters and exits (engages with and disengages from) the engagement slot 90 in the memory ring 91, while locking and unlocking the locking member.

That is, when the memory ring 91 rotates relative to the second rotating member, the memory pin 92, which has exited the engagement slot 90, slides on an outer circumferential surface 91s of the memory ring 91. This restricts an engaging action of the memory pin 92, which is accompanied by the locking action of the locking member. Also, returning the memory ring 91 to the predetermined relative rotation position, at which the memory pin 92 is capable of entering the engagement slot 90, permits the engaging action of the memory pin 92, which is accompanied by the locking action of the locking member.

However, in the above described conventional configuration, after relatively moving on the outer circumferential surface 91s of the memory ring 91, the memory pin 92 enters the engagement slot 90 with the circumferential portion apparently sliding on the boundary between the engagement slot 90 and the outer circumferential surface 91s, which is a sliding surface. That is, the engaging action of the memory pin 92, which is accompanied by the locking action of the locking member, starts when the memory pin 92 has not completely reached the entry position with respect to the engagement slot 90. Thus, the locking member is locked while the first and second rotating members are still moving relative to each other. This applies load on the locking member and the rotating members, which may produce noises and lower the durability.

PRIOR ART DOCUMENT

Patent Document

Patent Document 1: US Patent Application Publication No. 2013/0113260

SUMMARY OF THE INVENTION

Problems that the Invention is to Solve

Accordingly, it is an objective of the present invention to provide a seat reclining device for a vehicle that is capable of locking a locking member at the appropriate time.

Means for Solving the Problems

To achieve the foregoing objective and in accordance with a first aspect of the present invention, a seat reclining device for a vehicle is provided that includes a first rotating member, a second rotating member that is coaxial and arranged side by side with the first rotating member, a locking member that restricts relative rotation between the first rotating member and the second rotating member, a first memory member that is capable of rotating coaxially and integrally with the first rotating member by frictionally engaging with an outer surface of the first rotating member and capable of rotating relative to the first rotating member against frictional engagement force, a second memory member that is capable of engaging with and disengaging from the first memory member, and an operation mechanism that causes the second memory member to perform engaging/disengaging action with the first memory member and selectively locks and unlocks the locking member in conjunction with the engaging/disengaging action. The first memory member includes a sliding surface that, by sliding on the second memory member, restricts engaging action of the second memory member that is accompanied by the locking of the locking member, and an engagement slot. When the first memory member is at a predetermined relative rotation position with respect to the second rotating member, the engagement slot allows engaging action of the second memory member and engages with the second memory member, which has entered the engagement slot through the engaging action, thereby restricting relative rotation of the first memory member with respect to the second rotating member. The second memory member has a slide-trailing end that leaves the sliding surface last during relative rotation of the first memory member to the predetermined relative rotation position, wherein the slide-trailing end and a boundary between the sliding surface and the engagement slot are both sharp corners.

MODES FOR CARRYING OUT THE INVENTION

A seat reclining device according to one embodiment of the present invention will now be described with reference to FIGS. 1 to 17.

Figure 1:
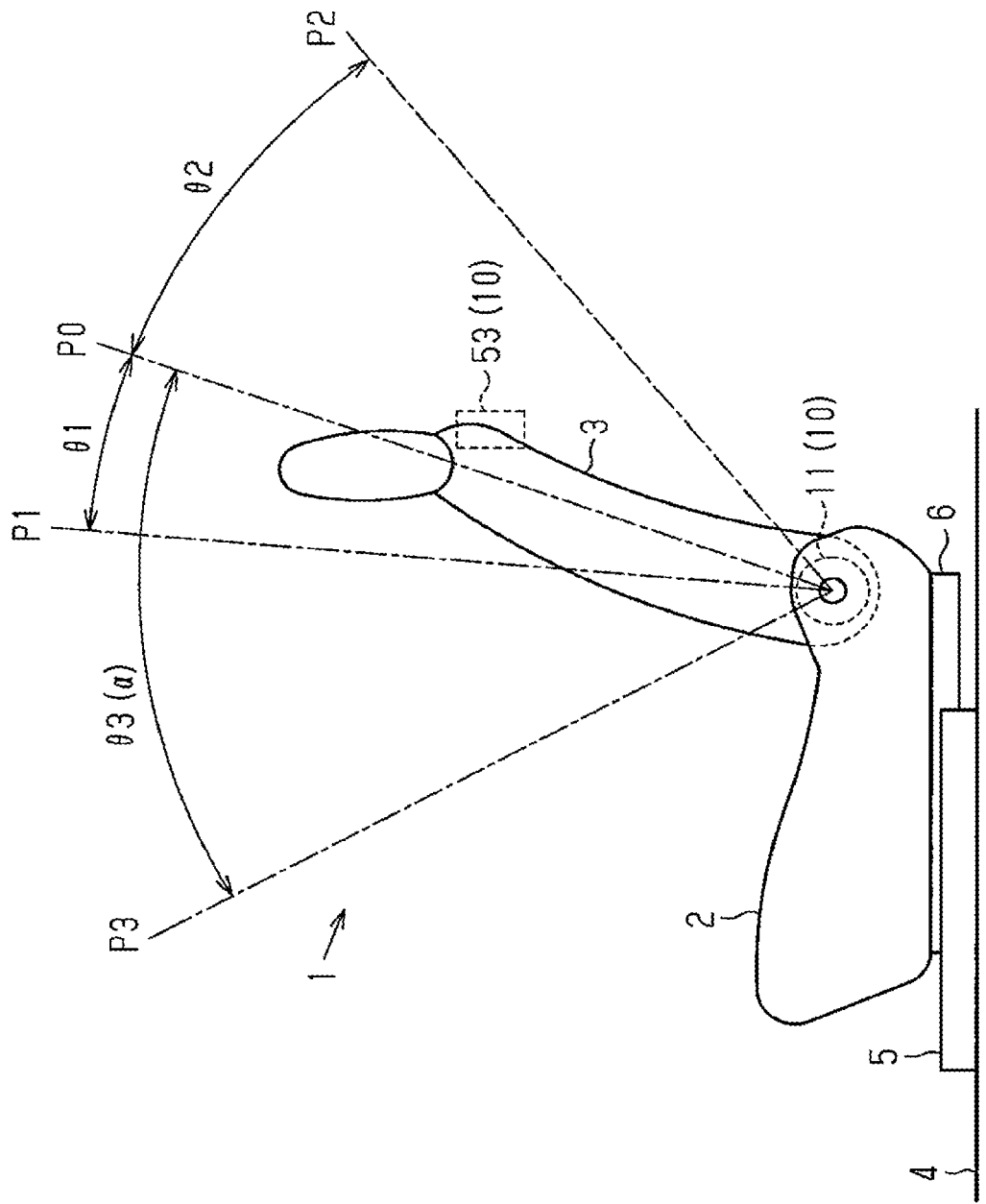
FIG. 1 is a side view of a vehicle seat in which a seat reclining device is installed.

As shown in FIG. 1, a vehicle seat 1 includes a seat cushion 2 and a seat back 3 tiltably provided on the rear end of the seat cushion 2. Right and left rails 5 and upper rails 6, which are moved on the lower rails 5 along the length, are provided on a floor 4 of the vehicle. The seat 1 is arranged on and supported by the upper rails 6, so that the position is adjustable in the front-rear direction of the vehicle. The seat 1 further has a seat reclining device 10 that is capable of adjusting the tilt angle of the seat back 3.

As shown in FIGS. 2 to 6, a recliner 11 is arranged between the seat cushion 2 and the seat back 3. The recliner 11 restricts and allows rotation of the seat back 3 relative to the seat cushion 2. The occupant of the vehicle manipulates an operation handle 13 arranged on the side of the seat cushion 2 to operate the recliner 11, thereby adjusting the tilt angle of the seat back 3.

Figure 2:
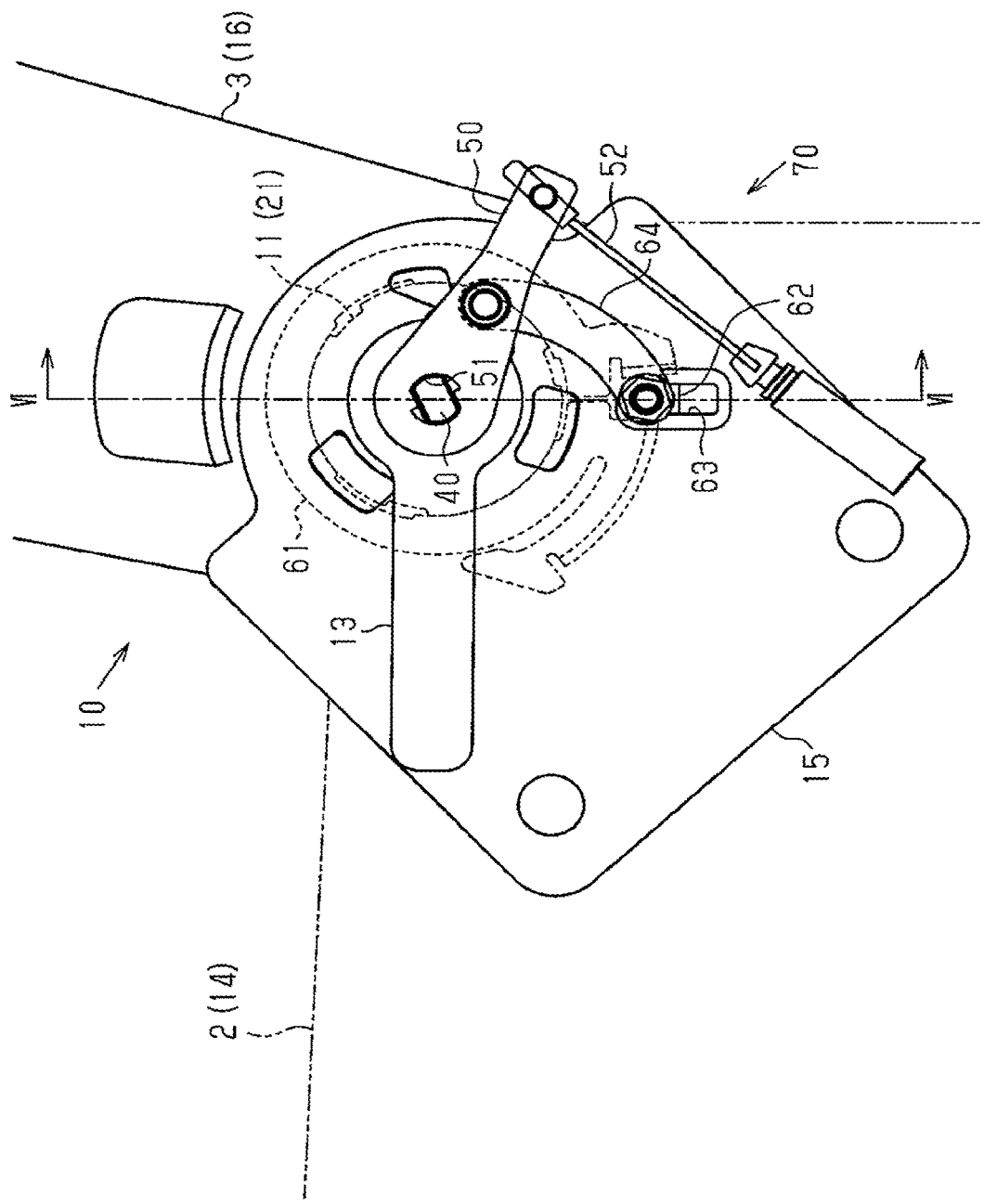
FIG. 2 is a side view of the seat reclining device.
Figure 3:
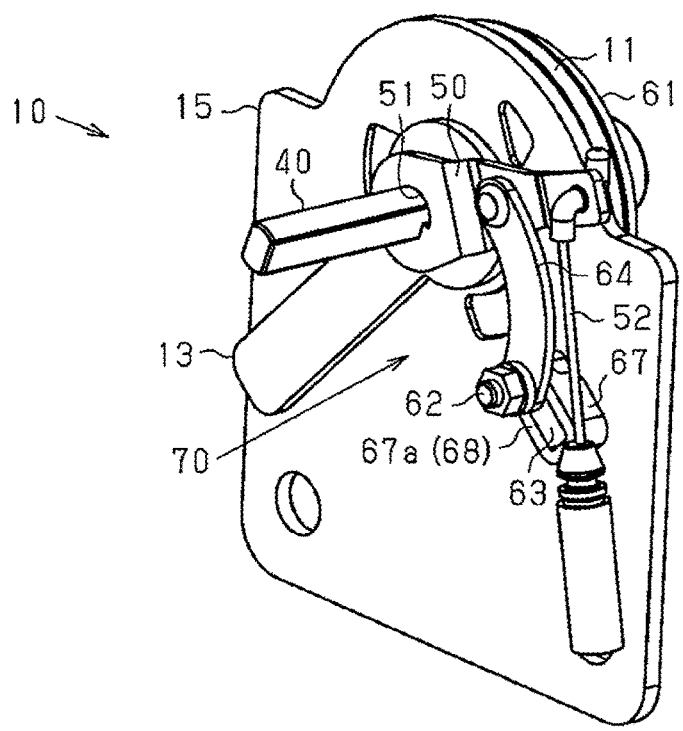
FIG. 3 is a perspective view of the seat reclining device.
Figure 4:
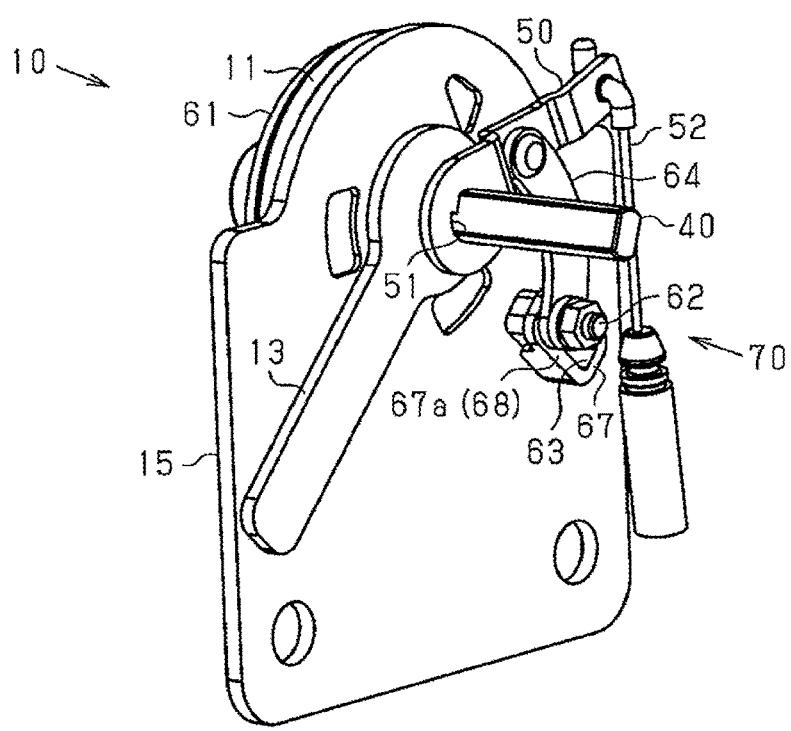
FIG. 4 is a perspective view of the seat reclining device.

The framework of the seat cushion 2 is constituted by a side frame 14. As shown in FIG. 2, a plate-shaped member, which is a support plate 15, extends upward from the rear end of the side frame 14. The support plate 15 is arranged on a side of the seat cushion 2 (on the side closer to the viewer of the sheet of FIG. 2 in the direction perpendicular to the sheet surface). The framework of the seat back 3 is constituted by a seat back side member 16, which is arranged on the inner side (on the far side from the viewer of the sheet of FIG. 2) of the support plate 15. The recliner 11 is held between the upper end of the support plate 15 and the proximal end of the seat back side member 16, which are arranged to face each other in the width direction of the seat 1. The recliner 11 is arranged on the either side of seat back 3 in the width direction.

Figure 6:
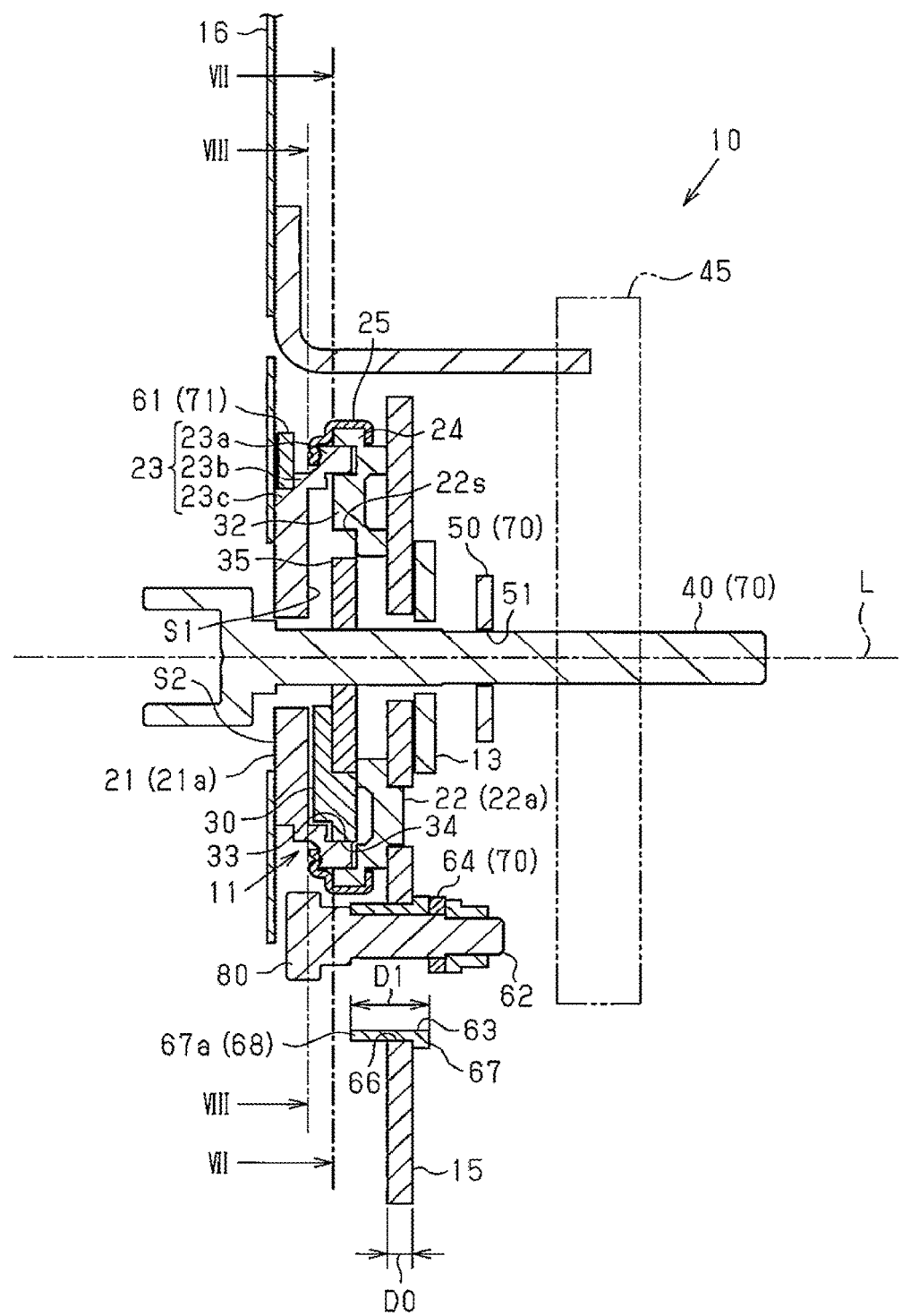
FIG. 6 is a cross-sectional view taken along line VI-VI of FIG. 2.
Figure 7:
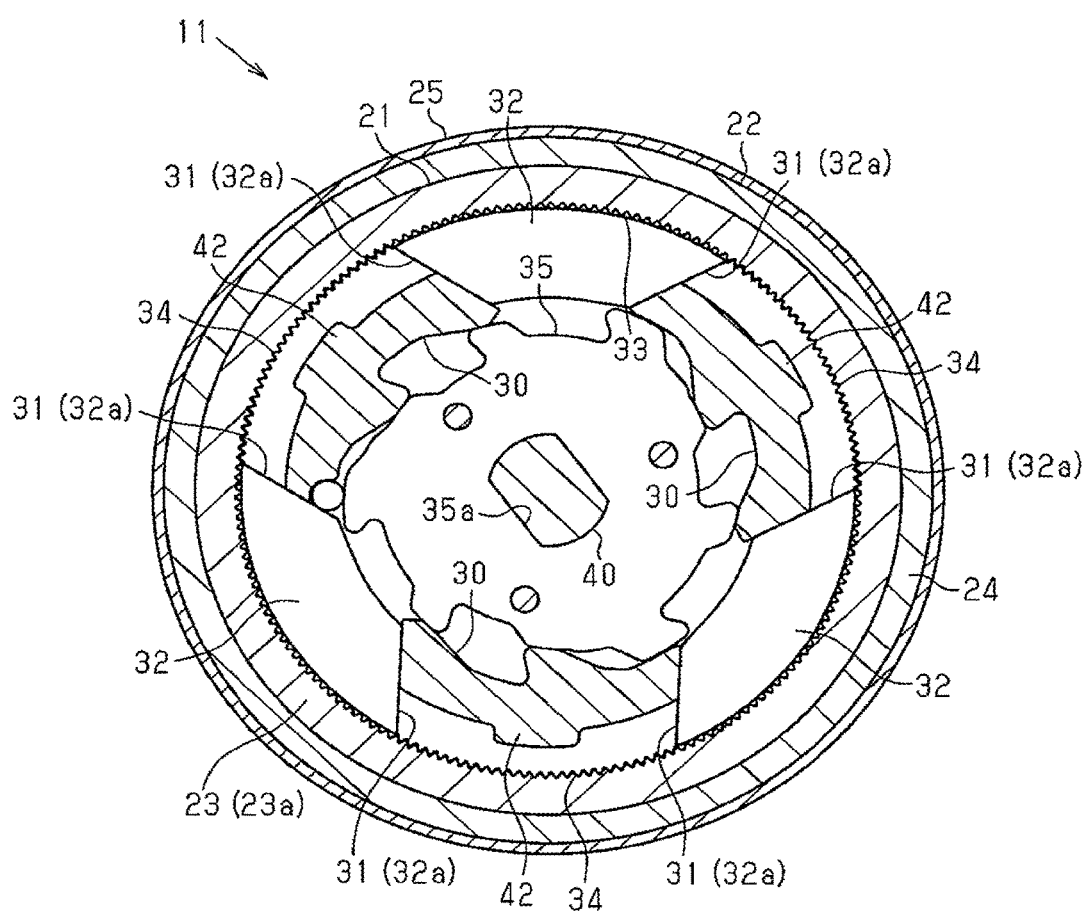
FIG. 7 is a cross-sectional view taken along line VII-VII of FIG. 6.
Figure 8:
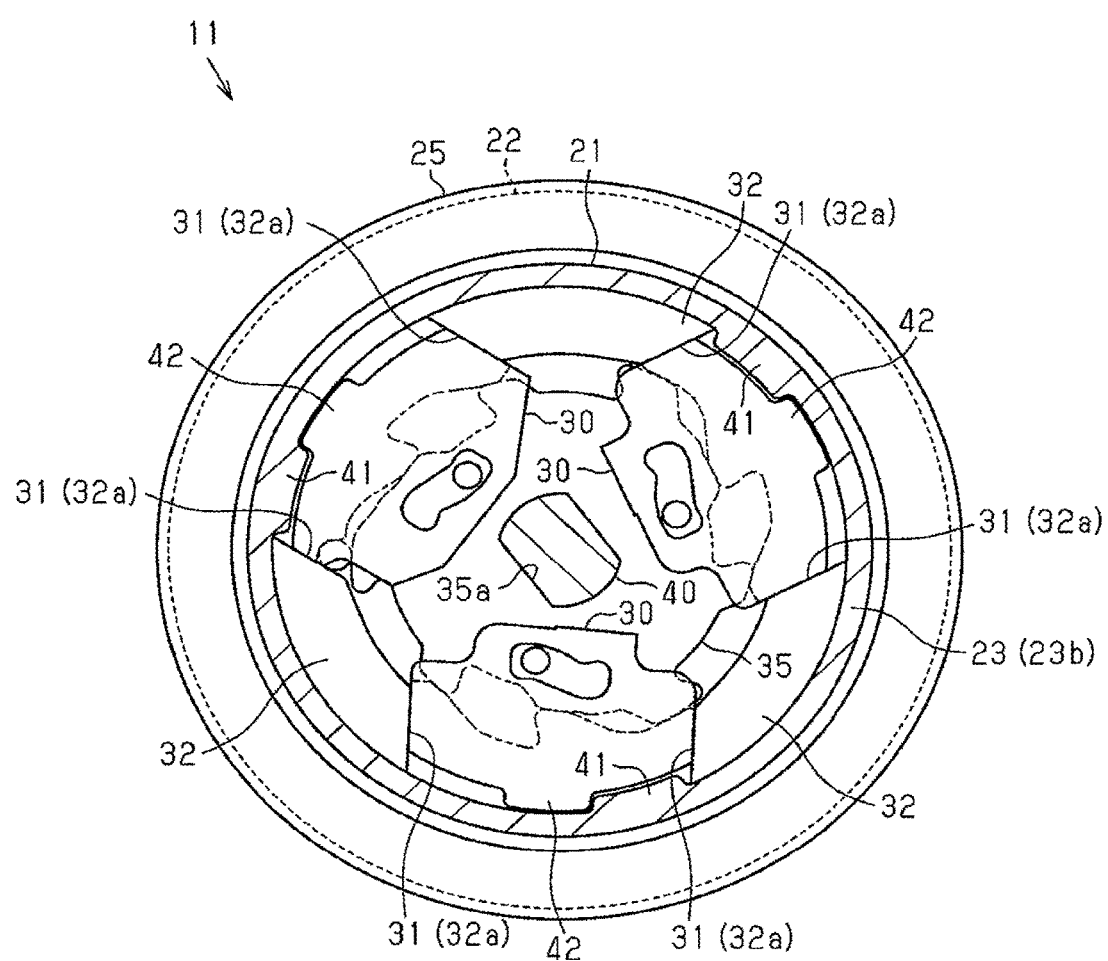
FIG. 8 is a cross-sectional view taken along line VIII-VIII of FIG. 6.

As shown in FIGS. 6 to 8, the recliner 11 includes first and second rotating members (an upper bracket and a lower bracket) 21, 22. The first and second rotating members 21, 22 have a rotational axis L, which is a common rotation center, and are arranged to be rotational relative to each other.

The first and second rotating members 21, 22 both have a substantially disk-like outer shape. Annular circumferential wall portions 23, 24 are formed about the circumferences of the first and second rotating members 21, 22, respectively. The circumferential wall portion 23 projects from a main body 21a of the first rotating member 21 toward a main body 22a of the second rotating member 22. The circumferential wall portion 24 projects from the main body 22a of the second rotating member 22 toward the main body 21a of the first rotating member 21. The first and second rotating members 21, 22 are arranged coaxially and rotational relative to each other by fitting the circumferential wall portions 23, 24 to each other.

The first rotating member 21 includes first and second circumferential wall portions 23a, 23b, which are not level with the circumferential wall portion 24 of the second rotating member 22, which is located at the outermost peripheries of the first and second rotating members 21, 22. The first circumferential wall portion 23a is located radially outward of the second circumferential wall portion 23b and has an outer diameter substantially equal to the inner diameter of the circumferential wall portion 24 of the second rotating member 22. This allows the first rotating member 21 to rotate relative to the second rotating member 22 with the first circumferential wall portion 23a sliding along the circumferential wall portion 24 of the second rotating member 22.

The recliner 11 includes an annular holder 25. The annular holder 25 has a cross-sectional shape that can hold the first circumferential wall portion 23a of the first rotating member 21 and the circumferential wall portion 24 of the second rotating member 22 in the thickness direction (the lateral direction as viewed in FIG. 6). The annular holder 25 is fitted about the first and second rotating members 21, 22 to allow the first and second rotating members 21, 22 to rotate relative to each other, while restricting relative movement along the rotational axis L.

As shown in FIG. 6, the first rotating member 21 is fixed to the proximal end of the seat back side member 16, and the second rotating member 22 is fixed to the upper end of the support plate 15 of the seat cushion 2. Three locking members (pawls) 30 are arranged between the first and second rotating members 21 and 22. The locking members 30 are engaged with the first and second rotating members 21, 22 to restrict relative rotation between the first and second rotating members 21 and 22.

As shown in FIGS. 6 to 8, the second rotating member 22 has guide portions 31, which are radially inward of the circumferential wall portion 24. The guide portions 31 hold the locking members 30, which are engaging members, such that the locking members 30 are allowed to move in the radial direction.

The locking members 30 are formed into plates. The second rotating member 22 has a facing surface 22s (the left surface as viewed in FIG. 6), which faces the first rotating member 21 along the axial direction of the rotational axis L. Three holding projections 32 are provided on the facing surface 22s. The holding projections 32 are arranged at substantially equal intervals in the circumferential direction. Each holding projection 32 has a sectorial shape. Accordingly, side wall portions 32a of any adjacent holding projections 32 are parallel with each other. Each locking member 30 is arranged between adjacent holding projections 32.

That is, each locking member 30 is held between the side wall portions 32a of the holding projections 32 adjacent to each other in the circumferential direction, so that the side wall portions 32a of the holding projections 32 function as the guide portions 31. Accordingly, each locking member 30 is held by the second rotating member 22 to be movable in the radial direction while sliding along the side wall portions 32a of the circumferentially adjacent holding projections 32. Also, each locking member 30 is held by the second rotating member 22 such that relative movement in the circumferential direction is restricted by contact with the side wall portions 32a.

As shown in FIG. 7, the first rotating member 21 has inner teeth 33 formed on the first circumferential wall portion 23a of the circumferential wall portion 23. The inner teeth 33 are formed over the entire annular inner circumference and project radially inward. Further, each locking member 30 has outer teeth 34 formed on the distal end, which faces radially outward when the locking member 30 is held by the second rotating member 22. The outer teeth 34 are configured to mesh with the inner teeth 33 of the first circumferential wall portion 23a. When the outer teeth 34 of the locking members 30 mesh with the inner teeth 33 of the first rotating member 21, the second rotating member 22, which holds the locking members 30, and the first rotating member 21 are restricted from rotating relative to each other.

As shown in FIGS. 2 to 6, the seat reclining device 10 includes an operation shaft 40, to which the operation handle 13 is fixed. The operation shaft 40 rotates integrally with the operation handle 13.

As shown in FIGS. 6 to 8, the operation shaft 40 extends through the recliner 11 in the thickness direction. The operation shaft 40 extends through the center of the main bodies 21a, 22a of the first and second rotating members 21, 22. The recliner 11 has a cam member 35, which is fixed to the operation shaft 40 to be non-rotational relative to the operation shaft 40. The operation shaft 40 has a width across flat, that is, a pair of parallel flat sections. The cam member 35 has a fitting hole 35a with two parallel flat sections. The operation shaft 40 is inserted into the fitting hole 35a, so that the cam member 35 is fixed to the operation shaft 40 to be a non-rotational relative to the operation shaft 40.

The cam member 35 is arranged radially inward of the locking members 30 with the circumference contacting the proximal ends of the locking members 30. The recliner 11 is configured such that, when the locking members 30 are moved radially due to rotation of the cam member 35, the outer teeth 34 of the locking members 30 engage with or disengage from the inner teeth 33 of the first rotating member 21.

As described above, when rotated clockwise relative to the second rotating member 22, which holds the locking members 30, as viewed in FIGS. 7 and 8, the cam member 35 moves the locking members 30 radially outward. Accordingly, the outer teeth 34 of the locking members 30 mesh with the inner teeth 33 of the first rotating member 21, so that the recliner 11 restrains the first and second rotating members 21, 22 to be non-rotational relative to each other, thereby bringing about a locked state of the seat back 3, at which the tilt angle of the seat back 3 is fixed relative to the seat cushion 2.

In contrast, when rotated counterclockwise as viewed in FIGS. 7 and 8, the cam member 35 moves the locking members 30 radially inward. Accordingly, the outer teeth 34 of the locking members 30 separate from the inner teeth 33 of the first rotating member 21, so that the recliner 11 allows the first and second rotating members 21, 22 to rotate relative to each other, thereby bringing about an unlocked state of the seat back 3, at which the tilt angle of the seat back 3 can be adjusted.

The operation shaft 40, which is a rotary shaft of the cam member 35, is urged clockwise as viewed in FIGS. 7 and 8, or in the locking direction, by the force of a torsion coil spring (not shown). When the operation handle 13 on the side of the seat cushion 2 is pulled up (a clockwise rotational action as viewed in FIG. 2), the operation shaft 40 is rotated in the unlocking direction, which is the counterclockwise direction as viewed in FIGS. 7 and 8. The force of the torsion coil spring rotates the operation shaft 40 in the locking direction when the operation handle 13 stops being pulled up.

As shown in FIG. 8, the second circumferential wall portion 23b of the first rotating member 21 has three control projections 41 on the inner circumference. The control projections 41 are arranged at substantially equal angular intervals in the circumferential direction. Each locking member 30 has an engaging projection 42, which projects radially outward toward the inner circumference of the second circumferential wall portion 23b. The recliner 11 controls locking and unlocking actions of the locking members 30 by causing the control projections 41 to contact the engaging projections 42.

When unlocking the locking members 30, the recliner 11 moves the engaging projections 42 to positions radially inward of the control projections 41 of the second circumferential wall portion 23b. In the unlocked state, the engaging projections 42 of the locking members 30 do not contact the control projections 41 of the second circumferential wall portion 23b, and the first and second rotating members 21, 22 are allowed to rotate relative to each other.

When the positions of the control projections 41 and the engaging projections 42 overlap with each other in the circumferential direction due to relative rotation of the first and second rotating members 21, 22, the control projections 41 contact the engaging projections 42 to restrict the locking members 30 from moving radially outward, so that the locking members 30 are restricted from being locked. That is, the recliner 11 locks the locking members 30 in a predetermined rotational angle range in which the control projections 41 of the second circumferential wall portion 23b and the engaging projections 42 of the locking members 30 do not overlap in the circumferential direction, thereby fixing the relative rotation positions of the first and second rotating members 21, 22. In the rotational angle range in which the control projections 41 contact the engaging projections 42, the locking members 30 are in the unlocked state.

As shown in FIG. 1, the seat reclining device 10 is capable of changing and fixing the tilt angle of the seat back 3 using the function of the recliner 11 within a range between a tilt angle θ1, which is inclined forward from a predetermined basic position P0, and a tilt angle θ2, which is inclined rearward from the basic position P0.

The adjustment limit of the forward tilting is an upright position P1. The seat 1 is capable of tilting the seat back 3 beyond the upright position P1 to a position that is spaced forward from the basic position P0 by a tilt angle (a maximum forward tilt position P3). In the present embodiment, stoppers (not shown) define the maximum forward tilt position P3 (the tilt angle θ3) and a maximum rearward tilt position P2 (the tilt angle θ2). In the front tilt range beyond the upright position P1, the recliner 11 is maintained unlocked even if the operation handle 13 is not kept up, and the tilt angle of the seat back 3 is not fixed.

Walk-in and Memory Function

Next, a walk-in and memory function implemented in the seat reclining device 10 will be described.

As shown in FIGS. 2 to 5, the seat reclining device 10 has a walk-in lever 50, which is capable of rotating the operation shaft 40 in the unlocking direction (the clockwise direction as viewed in FIG. 2), independently of the operation handle 13. Also, as shown in FIG. 6, the seat 1 has an urging member 45 such as a spiral spring that urges the seat back 3 forward. Accordingly, the seat reclining device 10 has a walk-in function that allows the recliner 11, which is arranged between the seat back 3 and the seat cushion 2, to be unlocked without pulling up the operation handle 13, thereby tilting the seat back 3 to the maximum forward tilt position P3.

As shown in FIGS. 2 to 5, and 9, the walk-in lever 50 has an insertion hole 51, into which the operation shaft 40 is inserted. A wire cable 52 is connected to the distal end of the walk-in lever 50. When pulled by the wire cable 52, the walk-in lever 50 is rotated in the unlocking direction (the clockwise direction as viewed in FIGS. 2 and 9) about the operation shaft 40 inserted in the insertion hole 51.

Figure 9:
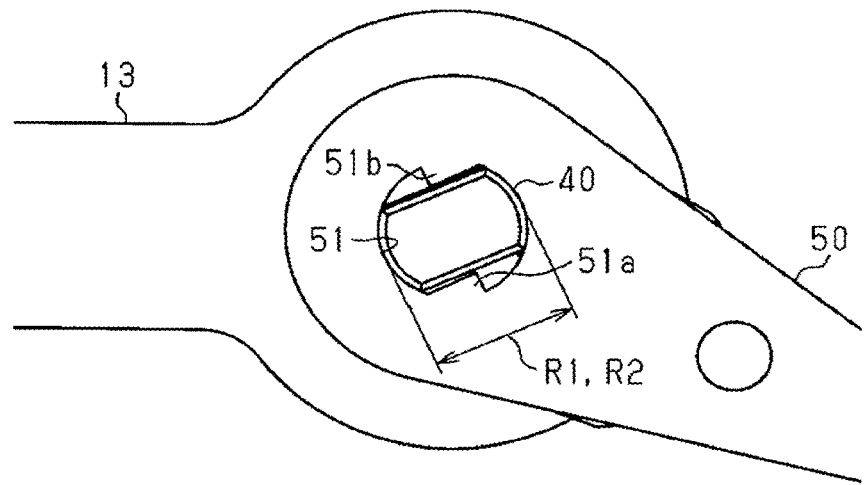
FIG. 9 is a side view of an operation handle, an operation shaft, and a walk-in lever.

As shown in FIG. 9, the insertion hole 51 has an inner diameter R2, which is substantially equal to the diameter R1 (the longitudinal dimension of the substantially rectangular cross section) of the operation shaft 40, which has two parallel flat sections. The insertion hole 51 has two engaging projections 51a, 51b on the inner circumference. Only when the walk-in lever 50 is rotated in the unlocking direction, the engaging projections 51a, 51b engage with the operation shaft 40 to cause the operation shaft 40 and the walk-in lever 50 to rotate integrally.

As shown in FIG. 1, a walk-in handle 53, which is operated from behind the seat 1, is provided in an upper part of the seat back 3. The other end of the wire cable 52 is connected to the walk-in handle 53.

That is, the seat reclining device 10 is configured such that manipulation of the walk-in handle 53 is transmitted to the walk-in lever 50 via the wire cable 52, so that the walk-in lever 50 is rotated in the unlocking direction integrally with the operation shaft 40, which is inserted in the insertion hole 51. When the operation handle 13, which is fixed to the operation shaft 40, is pulled up, the engaging projections 51a, 51b on the inner circumference of the insertion hole 51 do not engage with the two parallel flat sections of operation shaft 40. Thus, the seat reclining device 10 is configured such that, at the normal reclining manipulation performed by pulling up the operation handle 13, the operation shaft 40 inserted in the insertion hole 51 is rotated in the unlocking direction without rotating the walk-in lever 50.

Also, as shown in FIGS. 2 to 5, and 10, the seat reclining device 10 includes a first memory member 61 and a second memory member 62. The first memory member 61 engages with the outer surface of the first rotating member 21, which constitutes the recliner 11, through friction. The second memory member 62 is configured to engage with and disengage from the first memory member 61.

As shown in FIG. 6, the first memory member 61 is fitted to the circumferential wall portion 23 of the first rotating member 21. The first memory member 61 is allowed to rotate integrally and coaxially with the first rotating member 21 due to the frictional engagement force between the first memory member 61 and the circumferential wall portion 23. The first memory member 61 is also allowed to rotate relative to the first rotating member 21 against the frictional engagement force.

The first and second rotating members 21, 22 are formed by plastic deformation (pressing) of metal plates. Thus, the main body 21a, 22a are integrally formed with the circumferential wall portions 23, 24, respectively.

For example, when the first circumferential wall portion 23a of the first rotating member 21 is formed, a step is formed through plastic deformation in which an inner surface S1 of the first rotating member 21 is pushed toward an outer surface S2 (from the right side toward the left side as viewed in FIG. 6), and the step is formed as the outer periphery of the second circumferential wall portion 23b. Further, when the second circumferential wall portion 23b, which has the control projections 41 on the inner circumference, is formed, a step is formed by pushing a corresponding section toward the outer surface S2 through plastic deformation, and the formed step is a third circumferential wall portion 23c. The first memory member 61 is fitted to the outer circumferential surface of the third circumferential wall portion 23c of the first rotating member 21.

Figure 5:
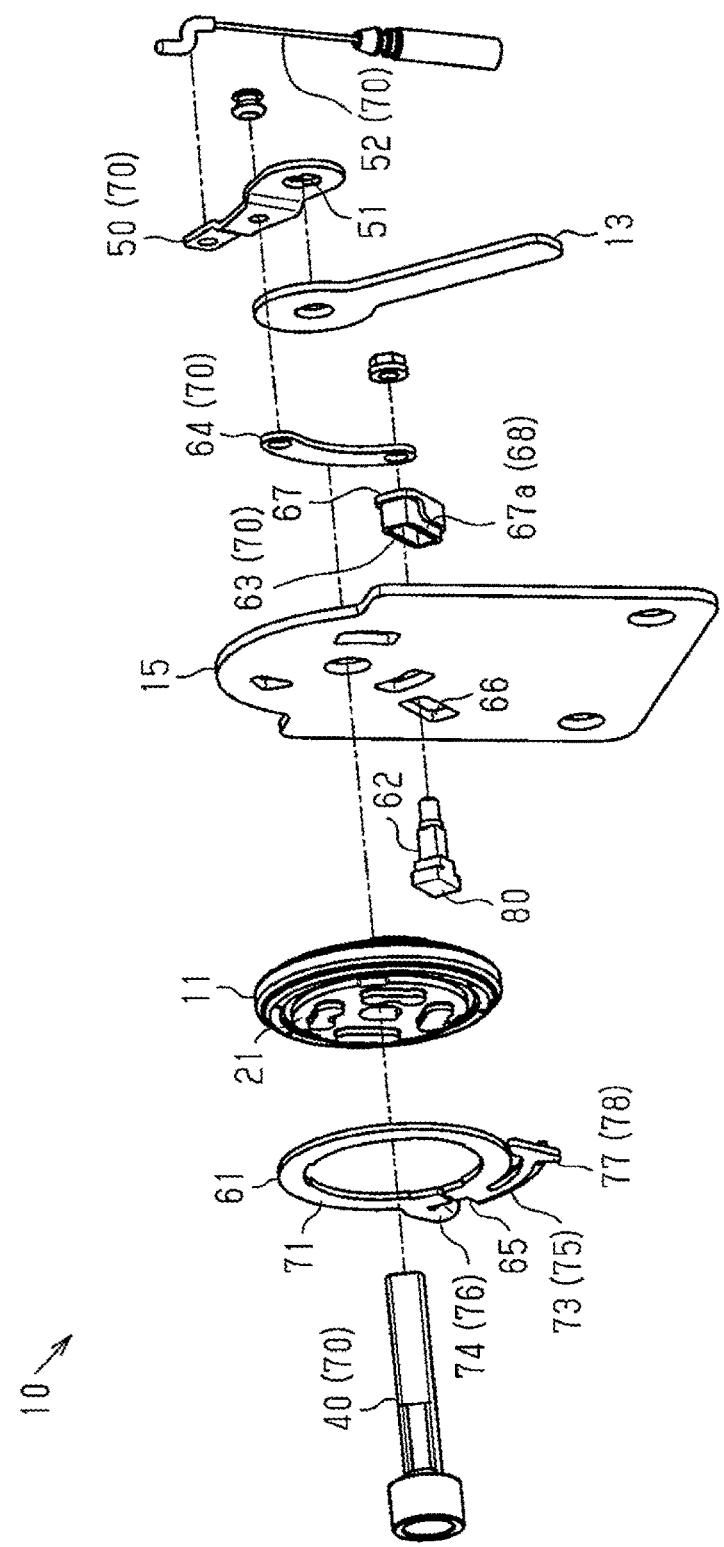
FIG. 5 is an exploded perspective view of the seat reclining device.
Figure 10:
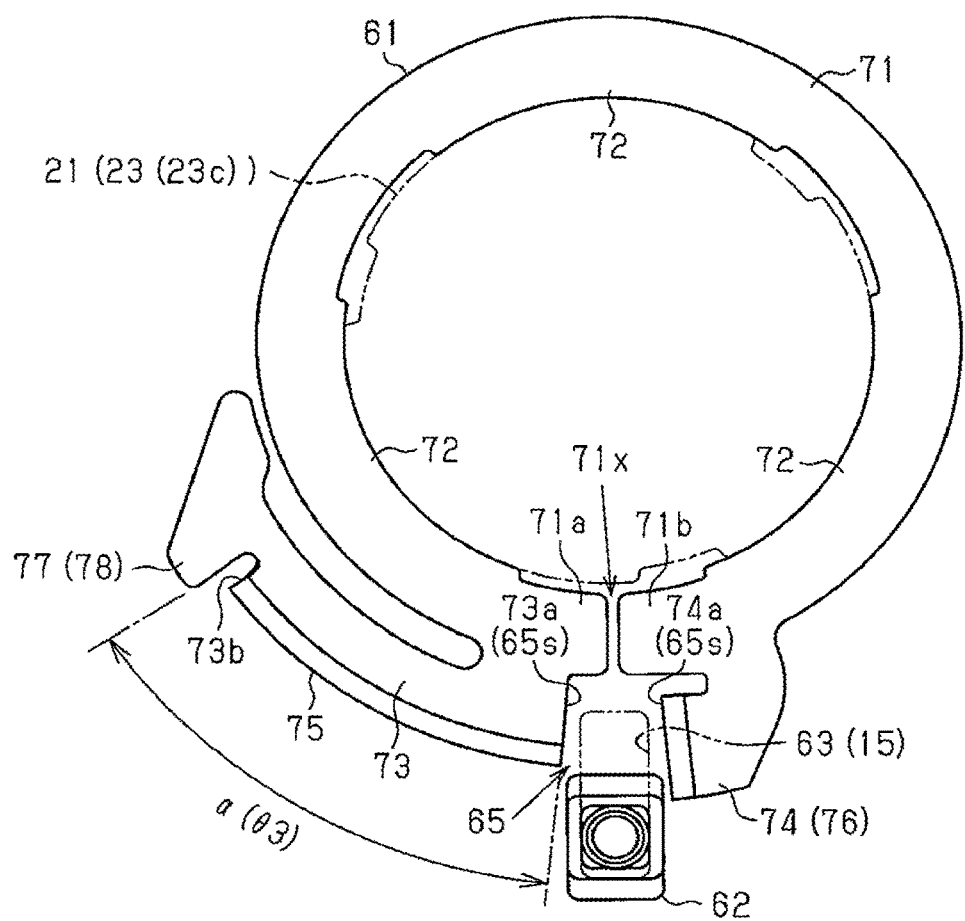
FIG. 10 is a side view of a first memory member and a second memory member.

In contrast, as shown in FIGS. 5 and 6, the second memory member 62 is substantially shaped as a shaft with a quadrangular cross section. The support plate 15, to which the second rotating member 22 is fixed, has a guide hole 63 for receiving the second memory member 62. The guide hole 63 has a shape elongated in the radial direction of the recliner 11, which is the vertical direction as viewed in FIGS. 2 and 6. The second memory member 62 is supported to be movable in the guide hole 63. As shown in FIG. 10, the first memory member 61 has an engagement slot 65. The second memory member 62, which moves in the guide hole 63, is capable of engaging with and disengaging from the engagement slot 65.

As shown in FIGS. 2 to 6, the guide hole 63 is formed by fitting a tubular member 67 to a through-hole 66 formed in the support plate 15. The tubular member 67 has an axial length D1 that is greater than the thickness D0 of the support plate 15. Thus, a peripheral wall 67a of the tubular member 67 functions as a support wall 68, which protrudes in the thickness direction of the support plate 15 in the periphery of the guide hole 63.

Figure 11:
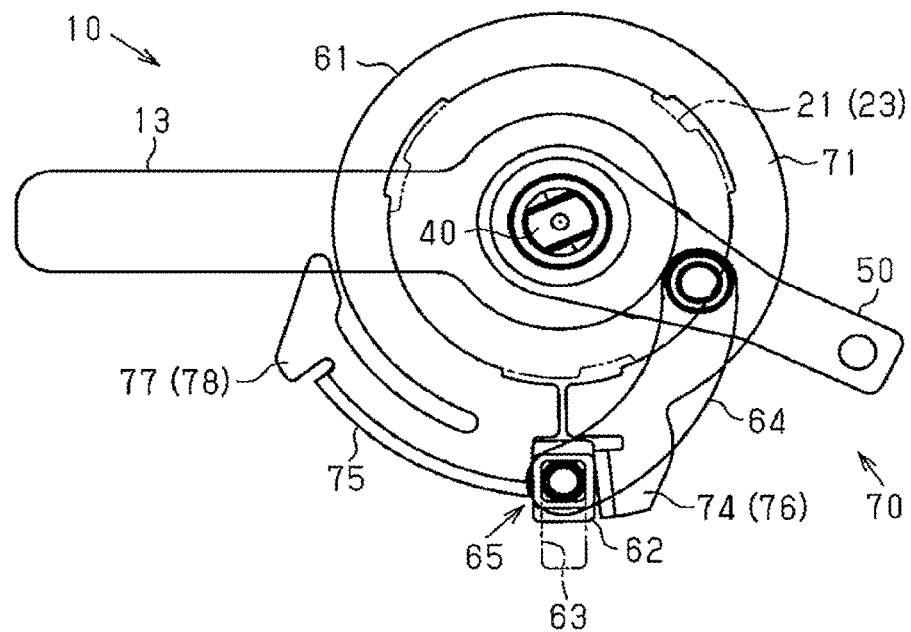
FIG. 11 is an explanatory diagram showing operation of the seat reclining device (first relative rotation position: engaged state).
Figure 12:
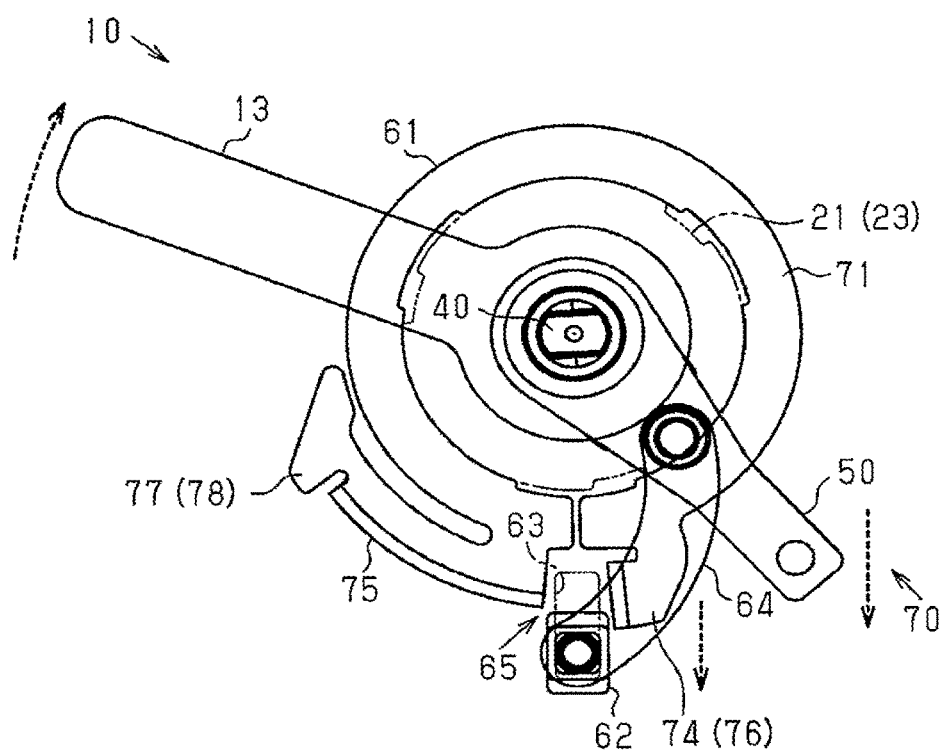
FIG. 12 is an explanatory diagram showing operation of the seat reclining device (first relative rotation position: separated state).

Also, as shown in FIGS. 2 to 5, the seat reclining device 10 includes a link member 64, which couples the second memory member 62 and the walk-in lever 50 to each other. As shown in FIGS. 11 and 12, the link member 64 is configured such that, when the walk-in lever 50 is rotated in the unlocking direction (the clockwise direction as viewed in FIGS. 11 and 12), the second memory member 62 in the guide hole 63 is moved radially outward in the recliner 11, that is, in a direction away from the first memory member 61 (downward in FIGS. 11 and 12). Accordingly, an operation mechanism 70 is formed, in which the second memory member 62 is either engaged with or disengaged from the first memory member 61. In accordance with engaging/disengaging action of the second memory member 62, the operation mechanism 70 selectively locks and unlocks the locking members 30.

As shown in FIG. 10, the first memory member 61 includes a frictional engagement portion 71, which has an annular shape with a discontinuous section (a C-ring shape). The frictional engagement portion 71 has sliding projections 72 on the inner circumference. The first memory member 61 causes the sliding projections 72 to slide on the first rotating member 21 and causes the frictional engagement portion 71 to be fitted to the circumferential wall portion 23 (23c) of the first rotating member 21, thereby generating adequate frictional engagement force between the frictional engagement portion 71 and the first rotating member 21.

The first memory member 61 has an arcuate extension 73, which has a circumferential end 73a in the vicinity of a cut 71x. The arcuate extension 73 projects radially outward from the frictional engagement portion 71. The first memory member 61 further includes a projection 74, which projects radially outward from the frictional engagement portion 71. The cut 71x exists between the projection 74 and the circumferential end 73a of the arcuate extension 73.

The engagement slot 65 of the first memory member 61 has two side wall surfaces 65s that are opposed to each other in the circumferential direction. The side wall surfaces 65s are a side surface 74a of the projection 74 and the circumferential end 73a of the arcuate extension 73. The cut 71x is arranged between a first end 71a and a second end 71b of the frictional engagement portion 71. The engagement slot 65 has the side wall surface 65s in the vicinity of the first end 71a and the side wall surface 65s in the vicinity of the second end 71b. When the second memory member 62 enters and engages with the engagement slot 65 of the first memory member 61, the first memory member 61 is restricted from rotating relative to the second rotating member 22.

Specifically, as shown in FIG. 11, when the walk-in handle 53 is not being manipulated, the second memory member 62 is arranged in the guide hole 63 of the support plate 15 and at a radially inner position (on the upper side as viewed in FIG. 11) in the first memory member 61. That is, the second memory member 62 is in the engagement slot 65 of the first memory member 61. This causes the second memory member 62 to engage with the first memory member 61, so that the first memory member 61 is restricted from rotating relative to the second rotating member 22, which is fixed to the support plate 15.

In this state, if the operation handle 13 on the side of the seat cushion 2 (see FIG. 2) is pulled up, the walk-in lever 50 is not rotated and the engagement of the second memory member 62 with the first memory member 61 is maintained. However, since pulling up the operation handle 13 unlocks the locking members 30, the first rotating member 21 is allowed to rotate relative to the second rotating member 22 against the frictional engagement force between the first rotating member 21 and the first memory member 61. In this manner, the normal reclining operation using the operation handle 13 allows the tilt angle of the seat back 3 to be adjusted.

In contrast, as shown in FIG. 12, when the walk-in handle 53 (see FIG. 1) is manipulated, the walk-in lever 50 is rotated in the unlocking direction. Thus, the second memory member 62 is moved in the guide hole 63 of the support plate 15 in the radially outward direction of the first memory member 61 (downward as viewed in FIG. 12). This causes the second memory member 62 to exit the engagement slot 65, so that the second memory member 62 and the first memory member 61 are disengaged from each other. The first memory member 61 is therefore allowed to rotate relative to the second rotating member 22.

At this time, in the recliner 11, rotation of the walk-in lever 50 of the operation mechanism 70 unlocks the locking members 30 (separation), so that the first and second rotating members 21, 22 are allowed to rotate relative to each other. Accordingly, the first rotating member 21 and the first memory member 61 are allowed to rotate integrally due to the frictional engagement force.

Figure 13:
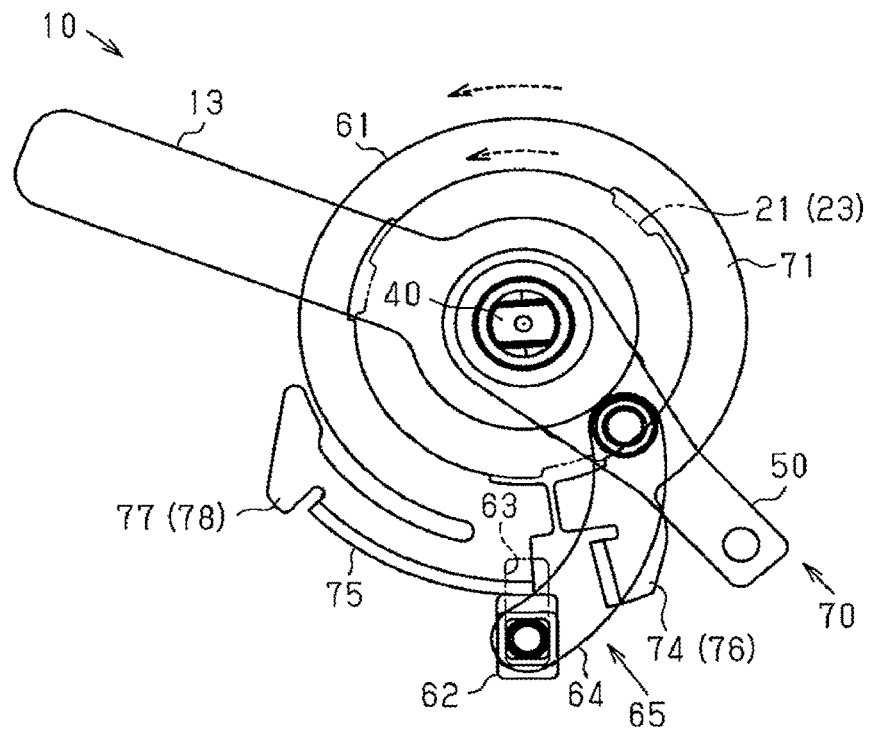
FIG. 13 is an explanatory diagram showing operation of the seat reclining device (forward folding operation).
Figure 14:
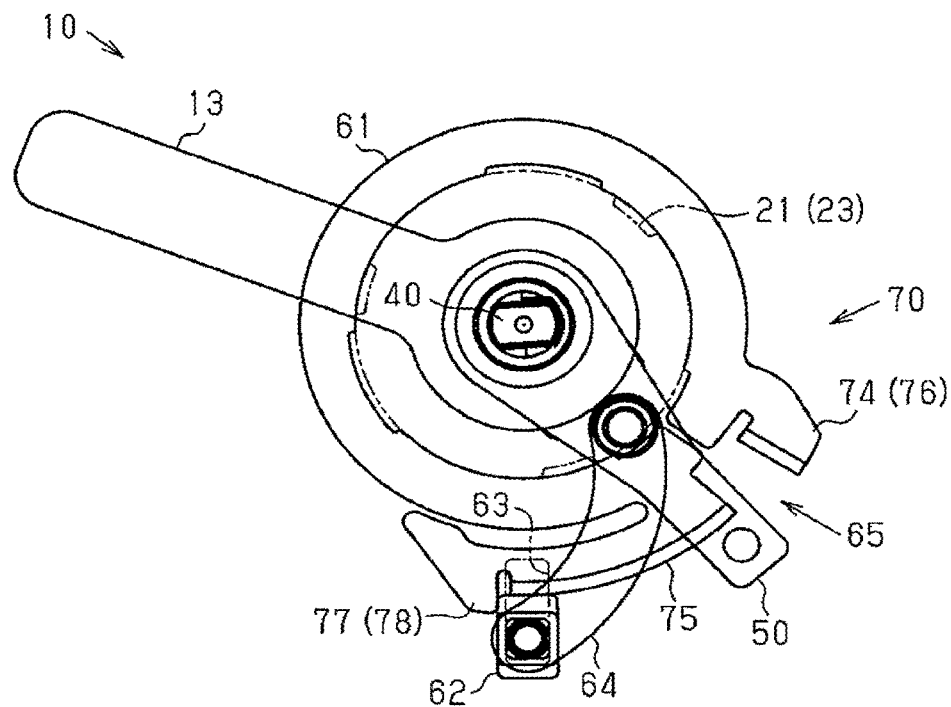
FIG. 14 is an explanatory diagram showing operation of the seat reclining device (second relative rotation position: contacting state).
Figure 15:
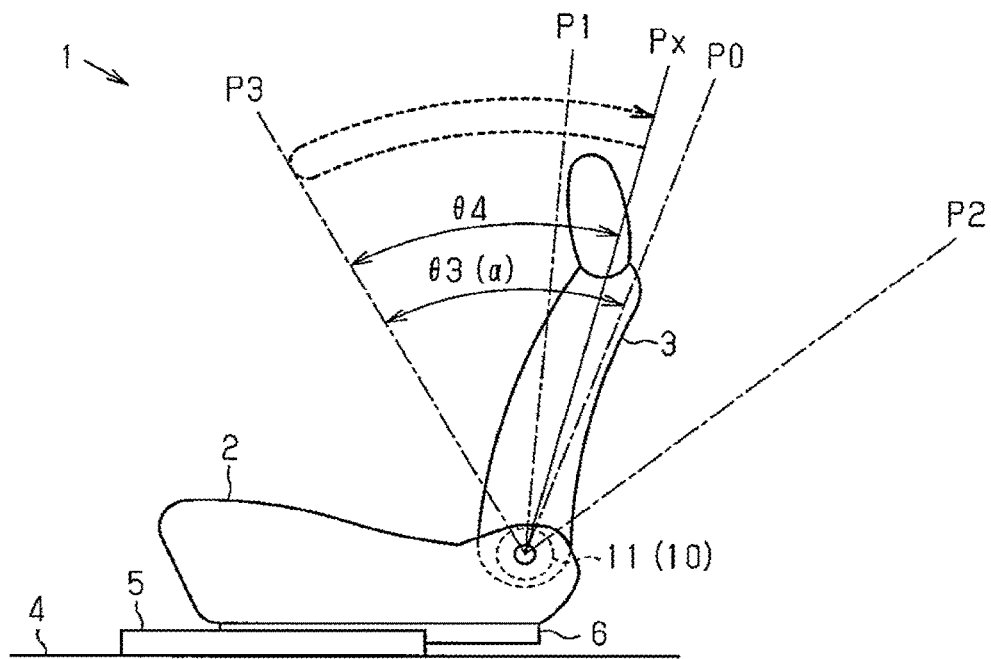
FIG. 15 is an explanatory diagram showing operation of the seat reclining device (the walk-in access enabling action from a forward tilted state).

As shown in FIGS. 10, 13, and 14, the arcuate extension 73 of the first memory member 61 has a sliding surface 75 on the outer periphery. When the first memory member 61 is rotated integrally with the first rotating member 21 as the seat back 3 is tilted, the second memory member 62 slides on the sliding surface 75 after exiting the engagement slot 65. This allows the seat back 3 to be tilted to the maximum forward tilt position P3 without continuing manipulation of the walk-in handle 53.

That is, since the recliner 11, which is arranged between the seat back 3 and the seat cushion 2, is unlocked while being urged by the urging member 45 (see FIG. 6), the seat back 3 is tilted forward. At this time, the first memory member 61 rotates integrally with the first rotating member 21, so that the second memory member 62 slides on the sliding surface 75 of the first memory member 61. This restricts engaging action of the second memory member 62 toward the radially inner side of the first memory member 61, so that rotation of the walk-in lever 50 in the counterclockwise direction in FIGS. 13 and 14 and the locking action of the locking members 30 are restricted. This maintains the unlocked state of the recliner 11, so that the seat back 3 is urged by the urging member 45 and reaches the maximum forward tilt position P3.

When the seat back 3, which has been folded forward by the walk-in function, is raised, the recliner 11 is maintained unlocked as long as the second memory member 62 is sliding on the sliding surface 75 of the first memory member 61.

That is, when the seat back 3 is raised, the first rotating member 21 and the first memory member 61 are rotated integrally due to the frictional engagement force, so that the second memory member 62 is moved along the sliding surface 75 of the first memory member 61 in the circumferential direction to the position where the second memory member 62 is capable of entering the engagement slot 65. This affects the memory function, which allows the seat back 3 to return to the tilt position at which the seat back 3 was located before the forward folding operation.

As shown in FIG. 10, the distal end of the projection 74 of the first memory member 61 projects further radially outward than the sliding surface 75 of the arcuate extension 73, which forms the two side wall surfaces 65s of the engagement slot 65 together with the projection 74.

As shown in FIG. 12, when the seat back 3 is tilted rearward with the first and second rotating members 21, 22 rotating relative to each other, the first memory member 61 rotates integrally with the first rotating member 21. Accordingly, the projection 74 contacts the second memory member 62 in the vicinity of the support plate 15 of the second rotating member 22. Specifically, the projection 74 contacts the second memory member 62 at a first relative rotation position Q1, at which the second memory member 62 is capable of entering the engagement slot 65. The projection 74 functions as a stopper portion 76 to restrict integral rotation of the first rotating member 21 and the first memory member 61 due to the frictional engagement force.

Also, as shown in FIG. 10, the arcuate extension 73 of the first memory member 61 has a second projection 77 in the vicinity of a circumferential end 73b that is on the opposite side to the engagement slot 65. Like the projection 74, the distal end of the second projection 77 extends further radially outward than the sliding surface 75 of the arcuate extension 73.

As shown in FIG. 14, when the seat back 3 is tilted forward with the first and second rotating members 21, 22 rotating relative to each other, the first memory member 61 rotates integrally with the first rotating member 21. Accordingly, the second projection 77 contacts the second memory member 62 in the vicinity of the second rotating member 22. Apparently, the second projection 77 contacts the second memory member 62 at a second relative rotation position Q2, where the second memory member 62, which moves on the sliding surface 75 in the circumferential direction, reaches the end of the sliding surface 75. The second projection 77 functions as a stopper portion 78 to restrict integral rotation of the first rotating member 21 and the first memory member 61 due to the frictional engagement force.

The frictional engagement force between the first memory member 61 and the circumferential wall portion 23 of the first rotating member 21 is set such that, even after the second memory member 62 contacts the second projection 77, which forms a stopper portion 78, the seat back 3 can reach the maximum forward tilt position P3 due to the force of the urging member 45. As shown in FIGS. 1 and 10, a relative rotation angle α between the first relative rotation position Q1 and the second relative rotation position Q2, which are set on the first memory member 61, is set to be equal to the tilt angle θ3 from the basic position P0 to the maximum forward tilt position P3 set for the seat back 3.

That is, if the tilt position Px of the seat back 3 before the forward folding operation is between the basic position P0 and the upright position P1, the tilt angle θ4 by which the seat back 3 reaches the maximum forward tilt position P3 through the forward folding operation is smaller than the tilt angle θ3 from the basic position P0 to the maximum forward tilt position P3 (θ4<θ3). The tilt angle θ4 is smaller than the relative rotation angle α between the first relative rotation position Q1 and the second relative rotation position Q2, which are set on the first memory member 61.

Thus, when the forward folding operation is started from such a forward tilt state, the second memory member 62 does not reach the end of the sliding surface 75, which contact the second projection 77. This maintains the relative rotation position of the first memory member 61, which is frictionally engaged with the first rotating member 21. Therefore, when raised after being folded forward, the seat back 3 returns to the tilt position Px, at which the seat back 3 was located before the forward folding operation.

Figure 16:
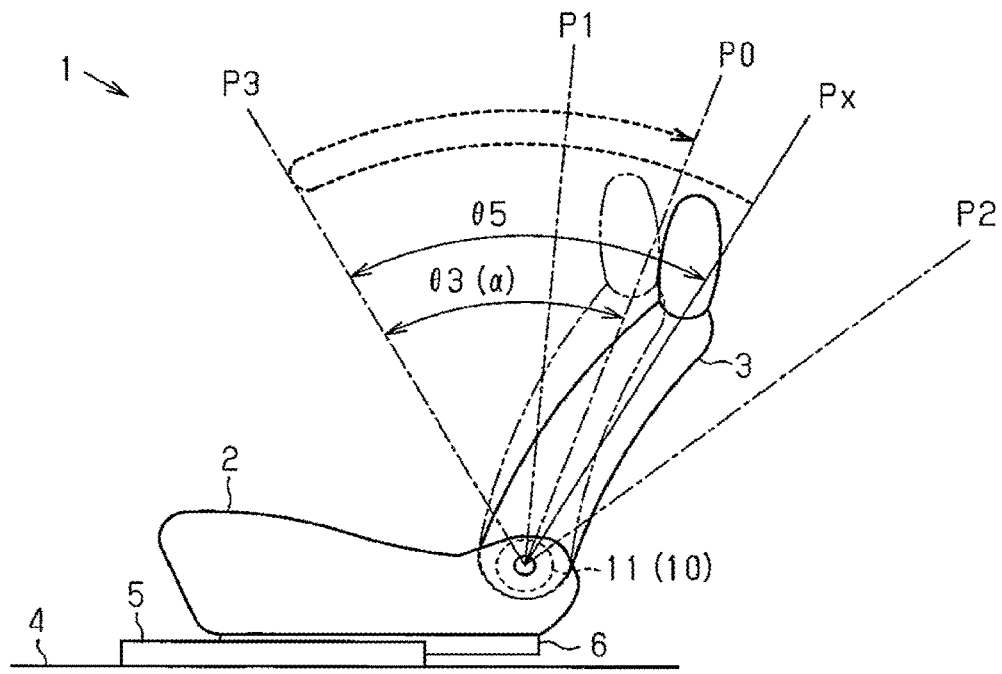
FIG. 16 is an explanatory diagram showing operation of the seat reclining device (the walk-in access enabling action from a rearward tilted state).

In contrast, if the tilt position Px' of the seat back 3 before the forward folding operation is behind the basic position P0 as shown in FIG. 16, the tilt angle θ5 by which the seat back 3 reaches the maximum forward tilt position P3 through the forward folding operation is greater than the tilt angle θ3 from the basic position P0 to the maximum forward tilt position P3 (δ5>δ3). The tilt angle θ5 is greater than the relative rotation angle α between the first relative rotation position Q1 and the second relative rotation position Q2, which are set on the first memory member 61.

Thus, when the forward folding operation is started from such a rearward tilt state, the second memory member 62 contacts the second projection 77, and the second projection 77 functions as the stopper portion 78. This restricts integral rotation of the first rotating member 21 and the first memory member 61 due to the frictional engagement force. After the second projection 77 reaches the second memory member 62, the seat back 3 reaches the maximum forward tilt position P3 due to the force of the urging member 45, so that the relative rotation position of the first rotating member 21 and the first memory member 61 is adjusted.

Through the adjustment, the rotation angle of the first memory member 61 relative to the second rotating member 22 agrees with the relative rotation angle α set between the first relative rotation position Q1 and the second relative rotation position Q2. Therefore, when raised after being folded forward, the seat back 3 returns to the basic position P0.

Structure for Allowing Second Memory Member to Enter Engagement Slot of First Memory Member Next, the structure for allowing the second memory member 62 to enter the engagement slot 65 of the first memory member 61 in the seat reclining device 10 will be described.

Figure 17:
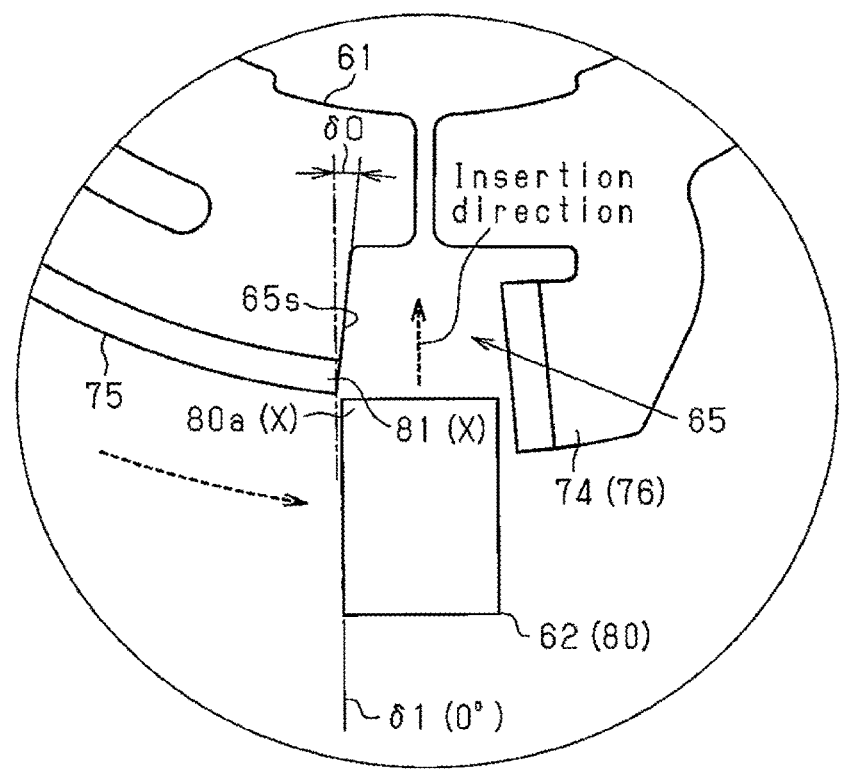
FIG. 17 is an explanatory diagram showing the structure through which the second memory member enters the engagement slot of the first memory member.

As shown in FIG. 17, the second memory member 62 has an insertion portion 80, which enters the engagement slot 65. The insertion portion 80 is shaped as a polygonal shaft with a substantially rectangular cross section. The longitudinal direction of the insertion portion 80 agrees with the direction in which the insertion portion 80 enters the engagement slot 65. A boundary 81 between the sliding surface 75 of and the engagement slot 65 of the first memory member 61 is a sharp corner X that has no distinct round shape.

That is, when the seat back 3 is raised after being folded forward by the walk-in function, the first memory member 61 rotates integrally with the first rotating member 21 due to the frictional engagement force to return to the first relative rotation position Q1, at which the second memory member 62 is capable of entering the engagement slot 65. At this time, the insertion portion 80 of the second memory member 62 apparently slides on the sliding surface 75 of the first memory member 61.

In the present embodiment, a slide-trailing end 80a of the insertion portion 80, which leaves the sliding surface 75 last, and the boundary 81 between the sliding surface 75 and the engagement slot 65 are both sharp corners X. Thus, at the relative rotation position Q1, the second memory member 62 is allowed to quickly enter the engagement slot 65

(without stopping). Also, the insertion portion 80 of the second memory member 62 is shaped like a polygonal shaft with a substantially rectangular cross section. Thus, the angle (δ1) between the side surface of the insertion portion 80 that constitutes the slide-trailing end 80a (the left side surface as viewed in FIG. 17) and the direction in which the insertion portion 80 enters the engagement slot 65 (the direction from the top to the bottom in FIG. 17) is 0°. Also, at the boundary 81 with the sliding surface 75, the angle δ0 between the side wall surface 65s of the engagement slot 65 and the direction in which the second memory member 62 enters the engagement slot 65 has a positive value and is the angle at which the second memory member 62 slides on the side wall surface 65s. This allows the locking members 30 to be locked in conjunction with the engaging action of the second memory member 62 at the appropriate time.

The present embodiment achieves the following advantages.

(1) The seat reclining device 10 includes the first rotating member 21, the second rotating member 22, which is arranged to be coaxial with the first rotating member 21, and the locking members 30, which restrict relative rotation between the first and second rotating members 21, 22. The seat reclining device 10 includes the first memory member 61 and the second memory member 62, which can be selectively engaged with and disengaged from the first memory member 61. The first memory member 61 is frictionally engaged with the outer surface S2 of the first rotating member 21 to rotate integrally with the first rotating member 21 and is also allowed to rotate relative to the first rotating member 21 against the frictional engagement force. Further, the seat reclining device 10 includes the operation mechanism 70, which causes the second memory member 62 to perform engaging/disengaging action and selectively locks and unlocks the locking members 30 in conjunction with the engaging/disengaging action. The first memory member 61 has the sliding surface 75. The sliding surface 75 slides on the second memory member 62 to restrict engaging action of the second memory member 62, which is accompanied by locking of the locking members 30. Further, the first memory member 61 has the engagement slot 65. When the first memory member 61 is at a certain relative rotation position (the first relative rotation position Q1) with respect to the second rotating member 22, the second memory member 62 is allowed to engage with the engagement slot 65, which causes the second memory member 62 to enter and engage with the engagement slot 65. That is, the seat reclining device 10 is configured to restrict the first memory member 61 from rotating relative to the second rotating member 22.

With this configuration, even when the second memory member 62 is in the engagement slot 65 of the first memory member 61, the first rotating member 21 can be rotated relative to the second rotating member 22 against the frictional engagement force of the first memory member 61. Accordingly, the tilt angle of the seat back 3 can be adjusted through the normal reclining operation, which is not accompanied by engaging/disengaging action of the second memory member 62 with the first memory member 61.

When the second memory member 62 exits the engagement slot 65, the first memory member 61 is rotational integrally with the first rotating member 21 due to the frictional engagement force. That is, the first and second rotating members 21, 22 rotate relative to each other, so that the sliding surface 75 of the first memory member 61 slides along the second memory member 62. This restricts engaging action of the second memory member 62, which is accompanied by the locking of the locking members 30. As a result, the unlocked state is maintained, in which the tilt angle of the seat back 3 is not fixed. The seat back 3 is thus tilted to the maximum tilt position without continuing the unlocking operation using the operation mechanism 70.

Further, when the folded seat back 3 is raised, the first memory member 61, which rotates integrally with the first rotating member 21, is returned to the first relative rotation position Q1 in relation to the second rotating member 22, so that the second memory member 62 is capable of entering the engagement slot 65. This allows for engaging action of the second memory member 62, which is accompanied by locking of the locking members 30, so that the tilt angle of the seat back 3 is fixed at the tilt position Px at which the seat back 3 was located before the folding operation.

The above illustrated configuration is easier to assemble than a recliner-incorporated configuration, in which each memory member is arranged between the first and second rotating members 21, 22. Also, the above illustrated configuration is highly flexible in the spatial arrangement and is thus advantageous in allowing for reduction in the thickness and accurate locking and unlocking.

(2) The sliding surface 75 is provided at the position that allows the first memory member 61 to rotate integrally with the first rotating member 21 to slide on the second memory member 62 due to the frictional engagement force when the seat back 3 is tilted forward with relative rotation between the first and second rotating members 21, 22.

With this configuration, the engaging action of the second memory member 62, which is accompanied by locking of the locking members 30, is restricted, and the unlocked state is maintained. Thus, the seat back 3 can be tilted to the maximum forward tilt position P3 without continuing the unlocking operation through the operation mechanism 70.

(3) The first memory member 61 includes the projection 74. When the seat back 3 is tilted rearward with relative rotation between the first and second rotating members 21, 22, the projection 74 contacts the second memory member 62 at the first relative rotation position Q1, where the second memory member 62 is capable of entering the engagement slot 65. The projection 74 functions as the stopper portion 76 to restrict integral rotation of the first rotating member 21 and the first memory member 61 due to the frictional engagement force.

With this configuration, when the first memory member 61 reaches the first relative rotation position Q1, at which the second memory member 62 is capable of entering the engagement slot 65, while the seat back 3, which has been folded forward, is being raised, the operator feels resistance (tactile sensation) due to the frictional engagement force between the first memory member 61 and the first rotating member 21. This indicates that the tilt angle of the seat back 3 can be fixed and thus ensures excellent operability.

When the first memory member 61 separates from the second memory member 62 while the locking members 30 are unlocked, the seat back 3 is restricted from being tilted rearward. This induces the forward folding of the seat back 3, thereby ensuring the walk-in function.

(4) The first memory member 61 includes the second projection 77. When the seat back 3 is tilted forward with relative rotation between the first and second rotating members 21, 22, the second projection 77 contacts the second memory member 62 at the second relative rotation position Q2, which is shifted by the predetermined relative rotation angle α from the first relative rotation position Q1, at which the second memory member 62 is capable of entering the engagement slot 65. The second projection 77 functions as the stopper portion 78 to restrict integral rotation of the first rotating member 21 and the first memory member 61 due to the frictional engagement force.

That is, even after the second memory member 62 contacts the second projection 77 due to forward folding operation of the seat back 3, the first rotating member 21 can be rotated relative to the second rotating member 22 against the frictional engagement force between the first rotating members 21 and the first memory member 61. Thus, with the above configuration, when the forward folded seat back 3 reaches the maximum forward tilt position P3 after the second memory member 62 contacts the second projection 77, the relative rotation position between the first rotating member 21 and the first memory member 61 is adjusted. Accordingly, the relative rotation angle between the first memory member 61 and the second rotating member 22 agrees with the predetermined relative rotation angle α, which is set between the first relative rotation position Q1 and the second relative rotation position Q2. This allows the seat back 3, which has been raised from the maximum forward tilt position P3, to be returned to a predetermined tilt position that corresponds to the relative rotation angle α.

That is, the predetermined relative rotation angle α is set to be equal to the tilt angle θ3, which is from the basic position P0 of the seat back 3 to the maximum forward tilt position P3. Thus, when the seat back 3 starts being folded forward from the tilt position Px, which is forward of the basic position P0, the seat back 3 is returned to the tilt position Px, at which the seat back 3 was located before the forward folding of the seat back 3. When the seat back 3 starts being folded forward from the tilt position Px', which is behind the basic position P0, the seat back 3, which has been raised from the maximum forward tilt position P3, is returned to the basic position P0. Accordingly, the raised seat back 3 does not contact the occupant sitting in the rear seat, which improves convenience.

(5) The seat back 3 is urged forward by the urging member 45. The frictional engagement force of the first memory member 61 acting on the first rotating member 21 is set such that the first and second rotating members 21, 22 rotate relative to each other due to the urging force of the urging member 45 even after the second memory member 62 contacts the second projection 77, which constitutes the stopper portion 78.

With the above configuration, the seat back 3 can be more easily folded forward. Also, the forward folded seat back 3 is stably returned to the basic position P0 when the seat back 3 reaches the maximum forward tilt position P3 due to the urging force of the urging member 45 after the second memory member 62 contacts the second projection 77.

(6) The second memory member 62, which slides on the sliding surface 75, is capable of entering the engagement slot 65, at the first relative rotation position Q1. When the first memory member 61 is rotated relative to the second rotating member 22 until the first memory member 61 reaches the first relative rotation position Q1, the slide-trailing end 80a leaves the sliding surface 75 last. The slide-trailing end 80a is the sharp corner X, which does not have a round shape. Further, the boundary 81 between the sliding surface 75 and the engagement slot 65 is also a sharp corner X having no distinct round shape.

(7) At the boundary 81 with the sliding surface 75, the angle between the side wall surface 65s of the engagement slot 65 and the direction in which the second memory member 62 enters the engagement slot 65 is defined as δ0. When the first memory member 61 is rotated relative to the second rotating member 22 until the first memory member 61 reaches the first relative rotation position Q1, the slide-trailing end 80a of the second memory member 62 leaves the sliding surface 75 last. The angle between the slide-trailing end 80a and the insertion direction of second memory member 62 is defined as δ1. The first memory member 61 and the second memory member 62 are configured such that the angle δ1 (0°) in the vicinity of the slide-trailing end 80a is smaller than the angle δ0 in the vicinity of the engagement slot 65 (δ1<δ0).

With the configuration according to the above mentioned items (6) and (7), the second memory member 62 readily enters the engagement slot 65 at the first relative rotation position Q1, at which the second memory member 62 is capable of entering the engagement slot 65. This allows the locking members 30 to be locked at the appropriate time.

(8) The insertion portion 80 of the second memory member 62, which enters the engagement slot 65, is shaped like a polygonal shaft. With this configuration, the slide-trailing end 80a of the second memory member 62, which leaves the sliding surface 75 last, can be defined as the sharp corner X. The angle (δ1) between the slide-trailing end 80a and the insertion direction of the second memory member 62 can be made smaller than the angle (δ0) between the side wall surface 65s of the engagement slot 65 and the insertion direction of the second memory member 62 at the boundary 81 between the slide-trailing end 80a and the sliding surface 75. As a result, the second memory member 62 can readily enter the engagement slot 65 by a simple configuration.

(9) The first rotating member 21 has the circumferential wall portion 23. The circumferential wall portion 23 is not level with the circumferential wall portion 24 of the second rotating member 22, which is at the outermost peripheries of the first and second rotating members 21, 22. The first memory member 61 is fitted to the circumferential wall portion 23 of the first rotating member 21.

This configuration reduces the space required for arranging the first memory member 61 in the radial direction of the first rotating member 21. Also, the measurement in the thickness direction along the rotational axis L is reduced compared to a case in which the first rotating member 21 and the first memory member 61 arranged side by side. This reduces the size of the device.

(10) The first rotating member 21 includes the first and second circumferential wall portions 23a, 23b, which are not level with each other. The first circumferential wall portion 23a has the inner teeth 33 on the inner circumference, which engage with and disengage from the outer teeth 34 formed on the locking members 30. Also, the second circumferential wall portion 23b has the control projections 41 on the inner circumference. When contacting the engaging projections 42 of the locking members 30, the control projections 41 are capable of controlling engaging/disengaging action of the locking members 30 with the inner teeth 33, that is, locking and unlocking of the locking members 30. The first and second circumferential wall portions 23a, 23b, which include locking function portions on the inner circumferences, are formed by plastic deformation (pressing). When the second circumferential wall portion 23b, which has the control projections 41, is formed, a step that is pushed toward the outer surface S2 of the first rotating member 21 through plastic deformation is formed as the third circumferential wall portion 23c. The first memory member 61 is fitted to the outer circumference of the third circumferential wall portion 23c of the first rotating member 21.

The locking function portions, which selectively lock and unlock the locking members 30, require a high level of accuracy. Thus, the circumferential wall portion having an inner circumference on which the locking function portions are formed is machined with high accuracy. Thus, if the circumferential wall portion is formed by plastic deformation, not only the inner circumference, but also the outer circumference of the circumferential wall portion will have high accuracy (roundness). Thus, with the above configuration, the frictional engagement force between the first rotating member 21 and the first memory member 61 can be easily controlled. This saves effort and time required for adjusting the frictional engagement force and thus improves the work efficiency.

Particularly, when the second circumferential wall portion 23b, which has the control projections 41 on the inner circumference, is formed, a step (the third circumferential wall portion 23c) is pushed toward the outer surface S2. The diameter of the step is smaller than those of the first and second circumferential wall portions 23a, 23b. Thus, by fitting the first memory member 61 to the step, the size of the device can be further reduced.

The above illustrated embodiment may be modified as follows.

In the above illustrated embodiment, the first memory member 61 includes the frictional engagement portion 71, which has an annular shape with a cut in the circumferential direction (a C-ring shape). However, the frictional engagement portion 71 may have any suitable shape such as an annular shape without a cut. A friction ring may be arranged between the first memory member 61 and the first rotating member 21.

The engagement slot 65 has side wall surfaces 65s, which are located in the vicinity of the first end 71a and the second end 71b of the frictional engagement portion 71 on the opposite sides of the cut 71x. However, the position of the engagement slot 65 in the first memory member 61 may be changed.

Further, the first memory member 61 includes the projection 74 and the second projection 77, which restrict integral rotation of the first rotating member 21 and the first memory member 61 due to the frictional engagement force. The projection 74 and the second projection 77 contact the second memory member 62 and respectively function as the stopper portions 76, 78. However, the first memory member 61 may have only one of the stopper portions 76, 78. The first memory member 61 may include neither of the stopper portions 76, 78.

The sliding surface 75 may be formed not only at the position that slides on the second memory member 62 when the seat back 3 is folded forward, but also at a position that slides on the second memory member 62 when the seat back 3 is tilted rearward. Also, the sliding surface 75 may be formed only at a position that slides on another component when the seat back 3 is tilted rearward. This configuration is suitable for a flat seat, which allows the seat back 3 to be tilted rearward until it becomes substantially level with the seat cushion 2.

In the above illustrated embodiment, the circumferential wall portion 24 of the second rotating member 22 is located at the outermost peripheries of the first and second rotating members 21, 22. The circumferential wall portion 23 of the first rotating member 21 is not level with the circumferential wall portion 24. The first memory member 61 is fitted to the circumferential wall portion 23 of the first rotating member 21, more specifically, to the third circumferential wall portion 23c of the circumferential wall portion 23. However, the first memory member 61 may be fitted to the first circumferential wall portion 23a, which has an inner circumference with the inner teeth 33, or the second circumferential wall portion 23b, which has an inner circumference with the control projections 41. Also, the circumferential wall portion 23 of the first rotating member 21 may be arranged at the outermost peripheries of the first and second rotating members 21, 22, and the first memory member 61 may be fitted to the circumferential wall portion 23 of the first rotating member 21, which is at the outermost peripheries.

A coupling member such as the annular holder 25 between the first and second rotating members 21, 22 may be fixed to the first rotating member 21. Alternatively, the first rotating member 21 may be fixed to the seat back 3 via a fixing member. In these above cases, such a coupling member or fixing member may be part of the first rotating member 21. Further, when a retaining member is used that is fixed the seat back 3, for example to the seat back side member 16 and arranged coaxially with the first rotating member 21, the retaining member may be part of the first rotating member 21. In this case, the first memory member 61 may be fitted to the outer periphery of the coupling member, the fixing member, or the retaining member.

In the above illustrated embodiment, the inner teeth 33 and the control projections 41 are provided on the inner circumference of the circumferential wall portion 23 of the first rotating member 21, which is fixed to the seat back 3. The guide portions 31, which hold the locking members 30 to be movable radially inward of the circumferential wall portion 24 of the second rotating member 22, which is fixed to the seat cushion 2. However, a first rotating member may hold locking members on the radially inner side of the circumferential wall portion, and a second rotating member may have inner teeth and control projections on the inner circumference of the circumferential wall portion. That is, the recliner 11 may be arranged between the seat cushion 2 and the seat back 3 with the front and back reversed from the case of the above illustrated embodiment. In this case also, the first memory member 61 is configured to frictionally engage with the first rotating member 21 of the seat back 3.

Figure 18:
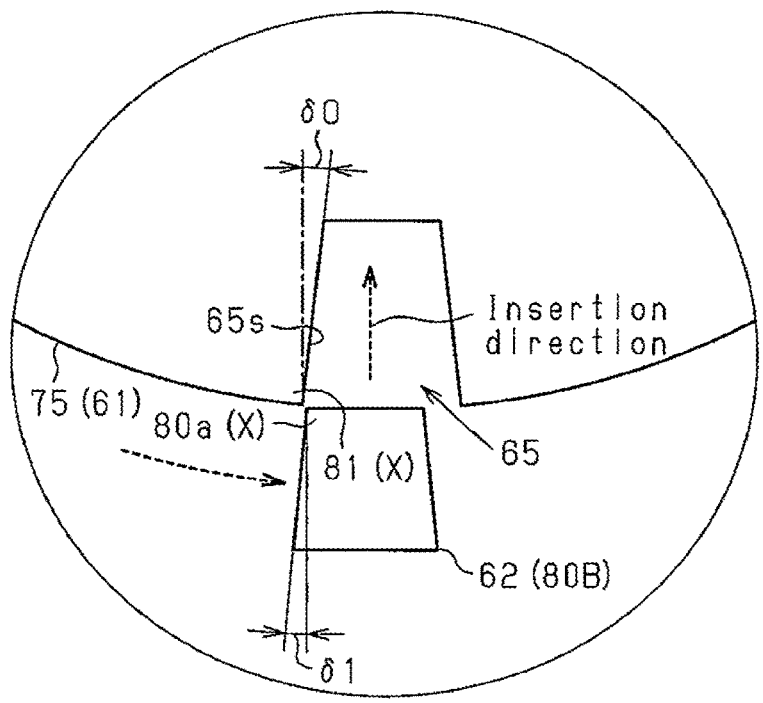
FIG. 18 is an explanatory diagram showing a structure through which the second memory member enters the engagement slot of the first memory member according to a modification.
Figure 19:
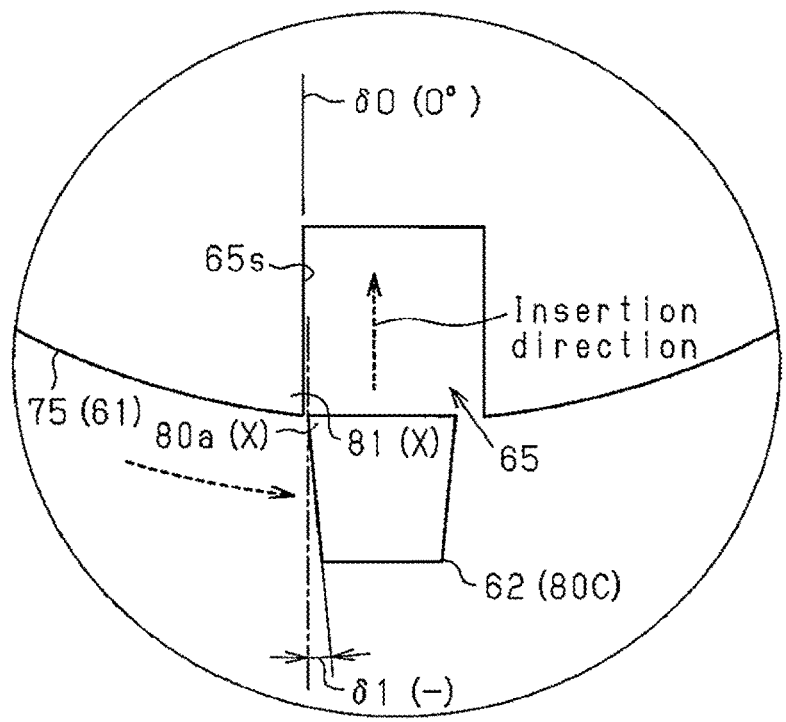
FIG. 19 is an explanatory diagram showing a structure through which the second memory member enters the engagement slot of the first memory member according to a modification.
Figure 20:
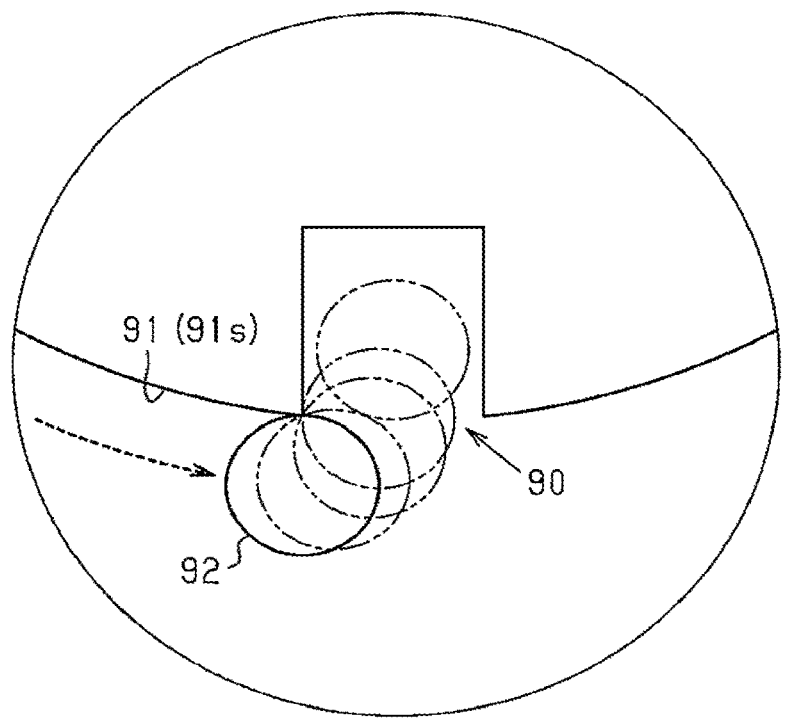
FIG. 20 is an explanatory diagram showing a conventional structure through which the second memory member enters the engagement slot of the first memory member.

In the above illustrated embodiment, the insertion portion 80 of the second memory member 62 is shaped like a polygonal shaft with a rectangular cross section as shown in FIG. 17. However, as shown in FIG. 18, an insertion portion 80B may be employed that is shaped like a polygonal shaft with a wedge-shaped cross section, that is, with a cross-sectional shape tapered toward the leading end in the insertion direction of the second memory member 62. Also, as shown in FIG. 19, an insertion portion 80C may be employed that is shaped like a polygonal shaft with wedge-shaped cross section, that is, with a cross-sectional shape tapered toward the trailing end in the insertion direction of the second memory member 62.

That is, it is preferable that the slide-trailing end 80a of the insertion portion 80 be the sharp corner X or that the angle δ1 between the slide-trailing end 80a and the insertion direction of the second memory member 62 be smaller than the angle δ0 between the side wall surface 65s of the engagement slot 65 and the insertion direction of the second memory member 62 at the boundary 81 between the slide-trailing end 80a and the sliding surface 75 (δ1<δ0). Thus, the cross-sectional shape of the second memory member 62 may be a polygonal shape other than a quadrangular shape. As in the case of the insertion portion 80C shown in FIG. 19, the angle δ1 between the slide-trailing end 80a and the insertion direction of the second memory member 62 may have a negative angle. This modification is particularly effective when, at the boundary 81 of the sliding surface 75, the angle δ0 between the side wall surfaces 65s of the engagement slot 65 and the insertion direction of the second memory member 62 is zero degrees or negative angle.

The sharp corner X, which is depicted as having no round shape, does not necessary have to be a complete vertex. That is, the sharp corner X may be chamfered as long as the appropriate time of locking is ensured.

In the above illustrated embodiment, the second memory member 62 enters or exits the engagement slot 65 by moving in the radial direction of the first memory member 61. However, the direction of entry and exit of the second memory member 62 does not necessarily need to agree with the radial direction of the first memory member 61. Also, the direction of entry and exit of the second memory member 62 does not necessarily need to agree with the direction toward the rotation center of the first memory member 61. Further, the path of the second memory member 62 when engaging with or disengaging from the first memory member 61 does not need to be straight, but may be arcuately curved. The side wall surfaces 65s of the engagement slot 65 may be curved such that the insertion direction of the second memory member 62 changes gradually after the second memory member 62 starts entering the engagement slot 65.

In the above described embodiment, the walk-in handle 53, which is arranged at the upper end of the seat back 3, is manipulated from behind the seat 1 to cause the seat back 3 to perform the walk-in access enabling action. However, the manipulation input portion of the operation mechanism 70 may have any suitable arrangement or shape. For example, the manipulation input portion may be a foot lever.

The invention claimed is:

1. A seat reclining device for a vehicle, comprising:
a first rotating member;
a second rotating member that is coaxial and arranged side by side with the first rotating member;
a locking member that restricts relative rotation between the first rotating member and the second rotating member;
a first memory member that is capable of rotating coaxially and integrally with the first rotating member by frictionally engaging with an outer surface of the first rotating member and capable of rotating relative to the first rotating member against frictional engagement force;
a second memory member that is capable of engaging with and disengaging from the first memory member; and
an operation mechanism that causes the second memory member to perform engaging/disengaging action with the first memory member and selectively locks and unlocks the locking member in conjunction with the engaging/disengaging action, wherein
the first memory member includes
a sliding surface that, by sliding on the second memory member, restricts engaging action of the second memory member that is accompanied by the locking of the locking member, and
an engagement slot, wherein, when the first memory member is at a predetermined relative rotation position with respect to the second rotating member, the engagement slot allows engaging action of the second memory member and engages with the second memory member, which has entered the engagement slot through the engaging action, thereby restricting relative rotation of the first memory member with respect to the second rotating member, and
the second memory member has a slide-trailing end that leaves the sliding surface last during relative rotation of the first memory member to the predetermined relative rotation position, wherein the slide-trailing end and a boundary between the sliding surface and the engagement slot are both sharp corners.

2. The seat reclining device for a vehicle according to claim 1, wherein the second memory member includes an insertion portion that enters the engagement slot and is shaped as a polygonal shaft.

3. The seat reclining device for a vehicle according to claim 1, further comprising a circumferential wall portion that is not level with outermost peripheries of the first and second rotating members, wherein the first memory member is fitted to the circumferential wall portion.

4. The seat reclining device for a vehicle according to claim 3, wherein
the first rotating member includes a locking function portion that selectively locks and unlocks the locking member, and
the circumferential wall portion is formed on the outer surface of the first rotating member through plastic deformation to provide the locking function portion, wherein the first memory member is fitted to the circumferential wall portion.

5. The seat reclining device for a vehicle according to claim 4, wherein
the first rotating member includes
a first circumferential wall portion that has inner teeth on an inner circumference, the inner teeth are capable of engaging with and disengaging from the locking member, and
a second circumferential wall portion that has a control projection on an inner circumference, wherein the control projection restricts the locking member from engaging with the inner teeth by contacting the locking member, and
a step is pushed toward the outer surface of the first rotating member when the second circumferential wall portion is formed through plastic deformation, wherein the first memory member is fitted to the step.

6. The seat reclining device for a vehicle according to claim 1, wherein the first memory member includes a stopper portion, and, when a seat back is tilted rearward with relative rotation between the first and second rotating members, the stopper portion contacts the second memory member at the predetermined relative rotation position, thereby restricting the first memory member from rotating integrally with the first rotating member due to the frictional engagement force.

7. The seat reclining device for a vehicle according to claim 1, wherein a first relative rotation position is defined at which the second memory member is capable of entering the engagement slot, and a second relative rotation position is defined that is at a predetermined rotation angle from the first relative rotation position, and wherein the first memory member includes a stopper portion, and, when a seat back is tilted forward with relative rotation between the first and second rotating members, the stopper portion contacts the second memory member at the second relative rotation position, thereby restricting the first memory member from rotating integrally with the first rotating member due to the frictional engagement force.

8. The seat reclining device for a vehicle according to claim 7, wherein the sliding surface is formed at a position where, when a seat back is tilted forward with relative rotation between the first and second rotating members, the first memory member and the first rotating member rotate integrally due to the frictional engagement force, so that the sliding surface slides on the second memory member.

9. The seat reclining device for a vehicle according to claim 8, wherein
the seat back is urged by an urging member, and
the frictional engagement force between the first rotating member and the first memory member is set such that the first and second rotating member are caused to rotate relative to each other by the force of the urging member after the stopper portion contacts the second memory member.

10. A seat reclining device for a vehicle, comprising:
a first rotating member;
a second rotating member that is coaxial and arranged side by side with the first rotating member;
a locking member that restricts relative rotation between the first rotating member and the second rotating member;
a first memory member that is capable of rotating coaxially and integrally with the first rotating member by frictionally engaging with an outer surface of the first rotating member and capable of rotating relative to first rotating member against frictional engagement force;
a second memory member that is capable of engaging with and disengaging from the first memory member; and
an operation mechanism that causes the second memory member to perform engaging/disengaging action with the first memory member and selectively locks and unlocks the locking member in conjunction with the engaging/disengaging action, wherein
the first memory member includes
a sliding surface that, by sliding on the second memory member, restricts engaging action of the second memory member that is accompanied by the locking of the locking member, and
an engagement slot, wherein, when the first memory member is at a predetermined relative rotation position with respect to the second rotating member, the engagement slot allows engaging action of the second memory member and engages with the second memory member, which has entered the engagement slot through the engaging action, thereby restricting relative rotation of the first memory member with respect to the second rotating member, and
the second memory member has a slide-trailing end that leaves the sliding surface last during relative rotation of the first memory member to the predetermined relative rotation position, wherein, at a boundary between the sliding surface and the engagement slot, an angle between the slide-trailing end and an insertion direction of the second memory member is smaller than an angle between a side wall surface of the engagement slot and the insertion direction.

* * * * *